(12) United States Patent
Kummer et al.

(10) Patent No.: US 9,161,090 B2
(45) Date of Patent: Oct. 13, 2015

(54) FAST CHANNEL CHANGE FROM ELECTRONIC PROGRAMMING GUIDE

(71) Applicant: EchoStar Technologies, LLC, Englewood, CO (US)

(72) Inventors: David Kummer, Highlands Ranch, CO (US); Steven Michael Casagrande, Castle Pines, CO (US); Charlie William Zetterower, Parker, CO (US); Kenneth Robert Hodge, Castle Rock, CO (US); William Michael Beals, Englewood, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 70 days.

(21) Appl. No.: 13/839,220

(22) Filed: Mar. 15, 2013

(65) Prior Publication Data

US 2014/0189736 A1 Jul. 3, 2014

Related U.S. Application Data

(60) Provisional application No. 61/746,511, filed on Dec. 27, 2012, provisional application No. 61/746,413, filed on Dec. 27, 2012.

(51) Int. Cl.
*H04N 7/16* (2011.01)
*H04N 5/445* (2011.01)
(Continued)

(52) U.S. Cl.
CPC ......... *H04N 21/482* (2013.01); *H04N 21/4263* (2013.01); *H04N 21/4384* (2013.01); *H04N 21/4424* (2013.01); *H04N 21/4532* (2013.01)

(58) Field of Classification Search
CPC ....................... H04N 21/4263; H04N 21/4384
See application file for complete search history.

(56) References Cited

U.S. PATENT DOCUMENTS

2003/0159157 A1* 8/2003 Chan ............................ 725/151
2003/0196211 A1 10/2003 Chan
(Continued)

FOREIGN PATENT DOCUMENTS

| EP | 1 879 376 A2 | 1/2008 |
| JP | 2009-130755 A | 6/2009 |
| WO | 2012/112928 A2 | 8/2012 |

OTHER PUBLICATIONS

European Search Report for EP 13197477.6 dated Apr. 2, 2014, 8 pages.
(Continued)

*Primary Examiner* — Rong Le
(74) *Attorney, Agent, or Firm* — Kilpatrick Townsend & Stockton, LLP

(57) ABSTRACT

Arrangements for preparing a television channel for presentation are presented. A set of one or more tuners that are idle may be identified. Being idle may correspond to not being used to receive any television channel data for presentation or recording. An electronic programming guide that indicates programming may be output for presentation. One or more television channels may be selected for preparation. The television channels may be selected based at least in part on one or more electronic programming guide operations and/or prior to receiving user input selecting a television channel of the one or more television channels for presentation. Each of the television channels may be prepared for presentation by tuning, by each tuner, to the one or more television channels prior to receiving the user input selecting the television channel of the television channels for presentation.

14 Claims, 15 Drawing Sheets

(51) Int. Cl.
*H04N 21/482* (2011.01)
*H04N 21/438* (2011.01)
*H04N 21/426* (2011.01)
*H04N 21/442* (2011.01)
*H04N 21/45* (2011.01)

(56) References Cited

U.S. PATENT DOCUMENTS

| 2004/0003399 A1* | 1/2004 | Cooper | 725/38 |
| 2004/0181813 A1 | 9/2004 | Ota et al. | |
| 2009/0322962 A1* | 12/2009 | Weeks | 348/726 |
| 2010/0131983 A1* | 5/2010 | Shannon et al. | 725/46 |
| 2011/0131622 A1 | 6/2011 | Wu et al. | |
| 2011/0310305 A1 | 12/2011 | Alexander | |
| 2012/0131627 A1 | 5/2012 | Chittella | |
| 2013/0135535 A1 | 5/2013 | Ling | |
| 2014/0189739 A1 | 7/2014 | Kummer et al. | |

OTHER PUBLICATIONS

U.S. Appl. No. 13/833,728, filed Mar. 15, 2013, Non-Final Office Action mailed Sep. 29, 2014, 34 pages.

* cited by examiner

FAST CHANNEL CHANGE FROM ELECTRONIC PROGRAMMING GUIDE

CROSS-REFERENCES TO RELATED APPLICATIONS

This application claims priority to U.S. provisional application 61/746,511, filed Dec. 27, 2012, entitled "Using Idle Resources to Reduce Channel Change Times", the entire disclosure of which is hereby incorporated by reference for all purposes.

This application claims priority to U.S. provisional application 61/746,413, filed Dec. 27, 2012, entitled "Fast Channel Change from Electronic Programming Guide,", the entire disclosure of which is hereby incorporated by reference for all purposes.

This application is related to co-pending U.S. application Ser. No. 13/833,728, filed Mar. 15, 2013, entitled "Using Idle Resources to Reduce Channel Change Times,", the entire disclosure of which is hereby incorporated by reference for all purposes.

BACKGROUND

When analog television service was the norm, "channel surfing" was a common occurrence. Rather than referring to a guide listing out the available television programming, a user may have picked up a remote control and repeatedly pressed "channel up" or "channel down" until a television program was displayed that caught the user's attention. At least in part due to the changed format of television service provider networks, such channel surfing has become less prevalent. As television service providers have transitioned to digital distribution networks, the ability for user equipment to quickly tune to a particular television channel may have diminished. For instance, due to factors such as video compression, it may take multiple seconds after a television channel is selected before the video for the selected television channel is available for presentation. Due to this delay time, a user may find it frustratingly slow to repeatedly change television channels.

SUMMARY

In some embodiments, a television receiver is presented. The television receiver may include a plurality of tuners. The television receiver may include one or more processors. The television receiver may include a memory communicatively coupled with and readable by the one or more processors and having stored therein processor-readable instructions. When executed by the one or more processors, the instructions may cause the one or more processors to cause a tuner of the plurality of tuners to tune to a first television channel. The first television channel may be output for presentation. The instructions may cause the one or more processors to identify one or more idle tuners of the plurality of tuners. Being idle may involve a tuner not being used to receive any television channels for presentation or recording. The instructions may cause the one or more processors to select one or more television channels other than the first television channel for preparation. The one or more television channels may be selected prior to receiving user input selecting a television channel of the one or more television channels for presentation. The instructions may cause the one or more processors to prepare each of the one or more television channels for presentation by causing each tuner of the one or more idle tuners to tune to the one or more television channels prior to receiving the user input selecting the television channel of the one or more television channels for presentation.

Embodiments of such a television receiver may include one or more of the following: The instructions configured to cause the one or more processors to cause the first subset of the one or more television channels to be buffered prior to receiving user input selecting the television channel of the one or more television channels for presentation may include processor-readable instructions which cause the one or more processors to cause at least one television program of the first subset to be buffered while scrambled. The instructions may cause the one or more processors to receive a channel change command prior to causing tuning to the first television channel. The channel change command may increment a television channel number by one such that the first television channel is selected. The processor-readable instructions for selecting the one or more television channels other than the first television channel for preparation may include processor-readable instructions that cause the one or more processors to select television channels having sequential television channel numbers immediately greater than the first television channel as the one or more television channels. The instructions may cause the one or more processors to, prior to causing tuning to the first television channel, receive a channel change command. The channel change command may decrement a television channel number by one such that the first television channel is selected. The processor-readable instructions configured to cause the one or more processor to select the one or more television channels other than the first television channel for preparation may include processor-readable instructions configured to cause the one or more processors to select television channels having sequential television channel numbers immediately less than the first television channel as the one or more television channels. The instructions may cause the one or more processors to decode the one or more television channels prior to receiving user input selecting the television channel of the one or more television channels for presentation. The instructions may cause the one or more processors to, prior to receiving user input selecting the television channel, discard output of the decoded one or more television channels. The instructions may cause the one or more processors to cause the one or more television channels to be buffered prior to receiving user input selecting the television channel of the one or more television channels for presentation. The instructions may cause the one or more processors to receive a channel change command selecting a television channel of the one or more television channels. The instructions may cause the one or more processors to, in response to receiving the channel change command, decode video of the buffered television channel.

In certain aspects, a television receiver may include one or more tuners, one or more processors, and a memory communicatively coupled with and readable by the one or more processors and having stored therein processor-readable instructions which, when executed by the one or more processors, may cause the one or more processors to perform a method. The method may include one or more of the following. A set of the one or more tuners that are idle may be identified. Being idle may correspond to not being used to receive any television channel data for presentation or recording. An electronic programming guide that indicates programming may be output for presentation. One or more television channels may be selected for preparation. The one or more television channels may be selected based at least in part on one or more electronic programming guide operations and/or prior to receiving user input selecting a television channel of the one or more television channels for presentation. Each of the one or more television channels may be prepared for presentation by tuning, by each tuner of the set of the one or more tuners, to the one or more television channels prior to receiving the user input selecting the television channel of the one or more television channels for presentation.

In some embodiments, a method for preparing a television channel for presentation is presented. The method may include tuning, by a tuner of a television receiver, to a first television channel. The first television channel may be output for presentation. The method may include identifying, by the television receiver, one or more idle tuners of the television receiver. A tuner being idle may include the tuner not being used to receive any television channels for presentation or recording. The method may include selecting, by the television receiver, one or more television channels other than the first television channel for preparation. The one or more television channels may be selected prior to receiving user input selecting a television channel of the one or more television channels for presentation. The method may include preparing each of the one or more television channels for presentation by tuning, by each tuner of the one or more idle tuners, to the one or more television channels prior to receiving the user input selecting the television channel of the one or more television channels for presentation.

Embodiments of such a method may include one or more of the following: The method may include, prior to tuning to the first television channel, receiving a channel change command. The channel change command may increment a television channel number by one such that the first television channel is selected. Selecting the one or more television channels other than the first television channel for preparation may include selecting television channels having sequential television channel numbers immediately greater than the first television channel as the one or more television channels. The method may include, prior to tuning to the first television channel, receiving a channel change command. The channel change command may decrement a television channel number by one such that the first television channel is selected. Selecting the one or more television channels other than the first television channel for preparation may include selecting television channels having sequential television channel numbers immediately less than the first television channel as the one or more television channels. The method may include decoding, by one or more decoders of the television receiver, the one or more television channels prior to receiving user input selecting the television channel of the one or more television channels for presentation. The method may include, prior to receiving user input selecting the television channel, discarding output of the decoded one or more television channels.

In certain aspects, a method for preparing a television channel for presentation may include one or more of the following. A set of the one or more tuners that are idle may be identified. Being idle may correspond to not being used to receive any television channel data for presentation or recording. An electronic programming guide that indicates programming may be output for presentation. One or more television channels may be selected for preparation. The one or more television channels may be selected based at least in part on one or more electronic programming guide operations and/or prior to receiving user input selecting a television channel of the one or more television channels for presentation. Each of the one or more television channels may be prepared for presentation by tuning, by each tuner of the set of the one or more tuners, to the one or more television channels prior to receiving the user input selecting the television channel of the one or more television channels for presentation.

Alternatively or additionally, embodiments of such a method may include one or more of the following: The method may include after decoding the one or more television channels prior to receiving user input selecting the television channel of the one or more television channels for presentation, receiving, by the television receiver, a channel change command that indicates the television channel of the one or more television channels. The method may include outputting for presentation, by the television receiver, the television channel using data obtained by decoding the television channel before receiving the channel change command. The method may include outputting for presentation, by the television receiver, an electronic programming guide that indicates programming on the one or more television channels. The method may include, for each of the one or more television channels, outputting for presentation, as part of the electronic programming guide, an indication that the television of the one or more television channels is being decoded. For each television channel of the one or more television channels, the indication for that the television channel is being decoded may be an image of an I-frame of the television channel. The method may include buffering, by the television receiver, the one or more television channels such that buffering for each television channel of the one or more television channels comprises: storing a most recent received I-frame; and storing P- and B-frames received after the most recently received I-frame. The method may include, after buffering the one or more television channels prior to receiving user input selecting the television channel of the one or more television channels for presentation, receiving, by the television receiver, a channel change command that indicates the television channel of the one or more television channels. The method may include, in response to receiving the channel change command that indicates the television channel, decoding the television channel using the most recently received I-frame and P- and B-frames received after the most recently received I-frame for the television channel. At least the I-frame may be buffered prior to receiving the channel change command. The method may include outputting for presentation, by the television receiver, the decoded television channel. The method may include receiving, by the television receiver from a television service provider, an indication of popular television channels. Selecting, by the television receiver, one or more television channels other than the first television channel for preparation may include selecting from the popular television channels. The method may include monitoring, by the television receiver, an amount for time spent outputting for presentation each television channel of a plurality of television channels. The method may include determining, by the television receiver, based on the amount of time for each television channel of the plurality of television channels, a set of most popular television channels. Selecting, by the television receiver, one or more television channels other than the first television channel for preparation may include selecting the one or more television channels based on the set of most popular television channels.

In some embodiments, a non-transitory processor-readable medium for preparing a television channel for presentation may be presented. The medium may include processor-readable instructions configured to cause one or more processors to cause a tuner of a television receiver to tune to a first television channel. The first television channel may be output for presentation. The instructions may be configured to cause the one or more processors to identify one or more idle tuners of the television receiver. A tuner being idle may include the tuner not being used to receive any television channels for presentation or recording. The instructions may be configured to cause the one or more processors to select one or more television channels other than the first television channel for preparation. The one or more television channels may be selected prior to receiving user input selecting a television channel of the one or more television channels for presentation. The instructions may be configured to cause the one or more processors to prepare each of the one or more television channels for presentation by causing each tuner of the one or more idle tuners to tune to the one or more television channels prior to receiving the user input selecting the television channel of the one or more television channels for presentation.

Embodiments of such a non-transitory computer readable medium may include one or more of the following: The instructions may be configured to cause the one or more processors to, prior to tuning to the first television channel, receive a channel change command. The channel change command may increment a television channel number by one such that the first television channel is selected. The processor-readable instructions for selecting the one or more television channels other than the first television channel for preparation comprises processor-readable instructions that cause the one or more processors to select television channels having sequential television channel numbers immediately greater than the first television channel as the one or more television channels. The instructions may be configured to cause the one or more processors to prior to tuning to the first television channel, receive a channel change command. The channel change command may decrement a television channel number by one such that the first television channel is selected. The processor-readable instructions configured to cause the one or more processor to select the one or more television channels other than the first television channel for preparation may include processor-readable instructions configured to cause the one or more processors to select television channels having sequential television channel numbers immediately less than the first television channel as the one or more television channels.

In certain aspects, a non-transitory processor-readable medium for preparing a television channel for presentation may include processor-readable instructions configured to cause one or more processors to perform one or more of the following. A set of the one or more tuners that are idle may be identified. Being idle may correspond to not being used to receive any television channel data for presentation or recording. An electronic programming guide that indicates programming may be output for presentation. One or more television channels may be selected for preparation. The one or more television channels may be selected based at least in part on one or more electronic programming guide operations and/or prior to receiving user input selecting a television channel of the one or more television channels for presentation. Each of the one or more television channels may be prepared for presentation by tuning, by each tuner of the set of the one or more tuners, to the one or more television channels prior to receiving the user input selecting the television channel of the one or more television channels for presentation.

BRIEF DESCRIPTION OF THE DRAWINGS

A further understanding of embodiments of the invention may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
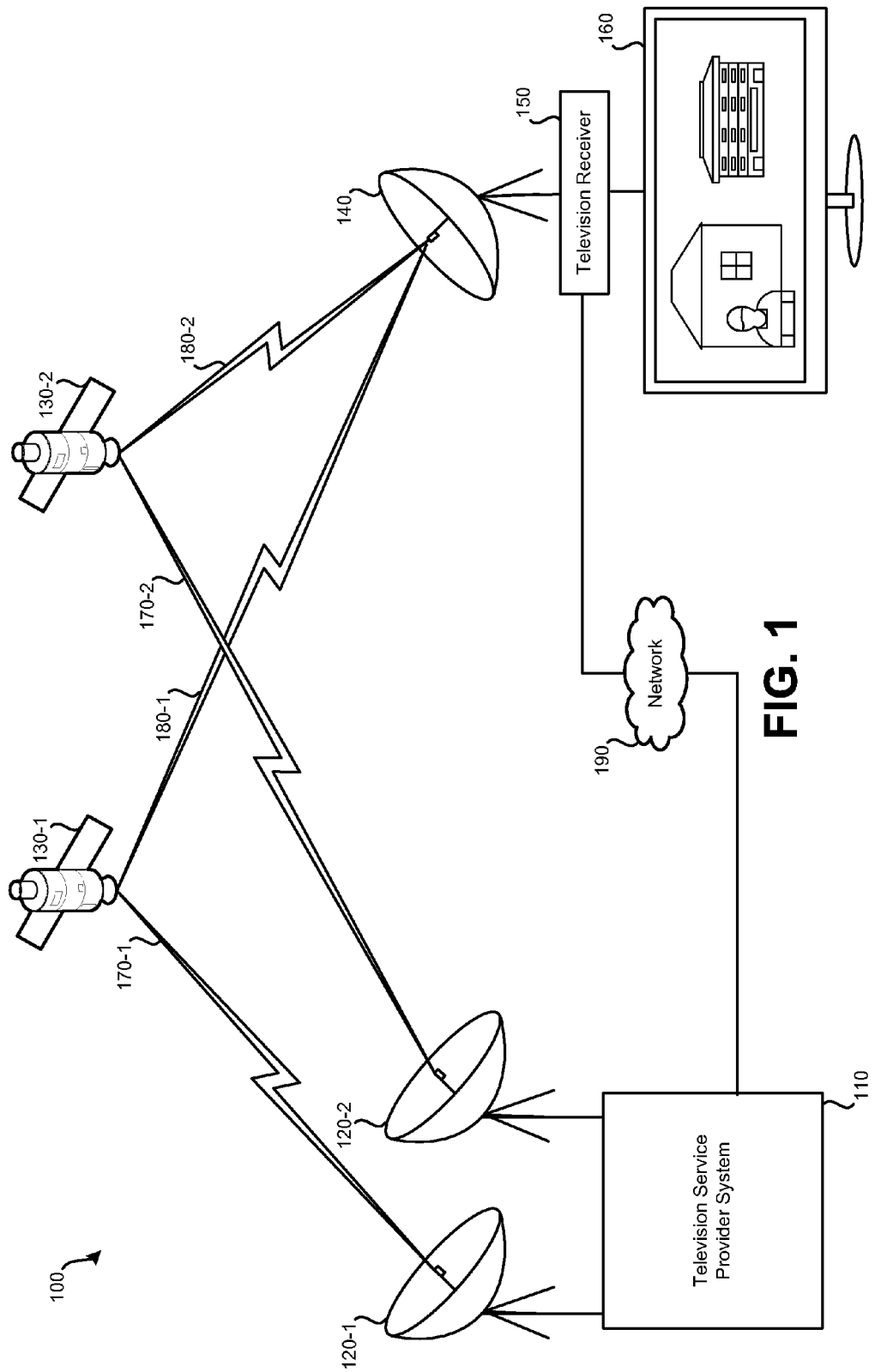
FIG. 1 illustrates an embodiment of a satellite television distribution system.

In digital television networks and more specifically satellite-based digital television networks, a significant time lag may exist between when a television channel is selected and when the television channel's video is decoded and is output for presentation (such as to a television). Part of the reason for this delay may be video compression. If, for example, MPEG video compression is used, an I-frame may need to be received and decoded before other frames (P- and B-frames) can be processed. If I-frames are transmitted several seconds apart, the television channel may not begin being presented until a first I-frame for the television channel is received. Besides video compression, other delays may be present for presenting a particular television channel. For instance, a television receiver may be required to tune to a particular frequency band to receive a television channel. For satellite television distribution systems, television channels may be transmitted as part of transponder streams from multiple transponders of multiple satellites. Depending on the television channel to be presented, the television receiver may be required to tune to a different satellite and/or transponder to receive the television channel. When the delay due to video compression and tuning a tuner of a television receiver are combined, it may be possible in a worst case scenario that about a seven second delay is present between when a television channel is selected and when the video is output for display to the television. This delay may be especially frustrating for the user if the user is repeatedly changing television channels, such as during "channel surfing," which is when a user is selecting consecutive television channels for viewing, such as by pressing a channel up or channel down button on a remote control. Such a delay may sufficiently annoy a user that the user gives up channel surfing.

To enable faster television channel changes, idle resources at a user's television receiver (e.g., set top box (STB)) may be used to prepare one or more television channels for presentation before a user selects the television channel for presentation. These resources may include tuners (used to receive signals transmitted by a television service provider), controlled access (CA) resources (such as a smartcard used for decryption), buffers, and/or decoders (used to decode compressed video and/or audio). In order to shorten the amount of time necessary to change television channels, unused hardware of the set top box may be used to tune to and/or decode one or more television channels predicted to be possibly desired by a user in the future. A set top box may need to assign resources to receive a television channel and to decode the television channel. For instance, a tuner of a set top box may need to tune to a transponder stream to receive the television channel. Further, decoder resources (which may be implemented as hardware (e.g., an integrated circuit) or may be a process performed by a processor) may need to decode the compressed video (and audio) into a format appropriate for output to a presentation device. Set top boxes may be equipped with multiple tuners and/or decoder hardware capable of receiving and decoding multiple television channels at a given time. The primary purpose of such hardware may be so that while a particular television channel is being watched, another television channel may be watched (e.g., using another television or via picture-in-picture) or recorded (e.g., using a digital video recorder (DVR) of the set top box). For example, some set top boxes which are intended to serve the television needs of an entire household may have eight tuners and decoding resources sufficient to simultaneously receive and decode eight different television channels.

Since multiple tuners may be present in a set top box, there may be periods of time when at least some of the television tuners and decoding resources are unused. For example, if only one person in a household is watching television and nothing is being recorded via the set top box's DVR capabilities, only a single tuner and little of the decoding resources are used. As such, multiple tuners and decoding resources of the set top box may be idle. Rather than remaining idle, these tuners and decoding resources may be used to tune to and, possibly, decode television channels that are predicted as possible to be selected for presentation by the user.

As an example, if a user is "channel surfing" such as by using the channel up button on a television receiver's remote control, idle tuners and decoding resources may be used to predictively tune to and decode television channels likely to be selected next. These television channels may be the television channels having consecutive television channel numbers immediately greater than the current television channel output for presentation. As such, if the user again issues a "channel up" command, the next television channel may already be tuned to and decoded (using another tuner and decoding resources), thus allowing the television channel to be presented to the user sooner than if tuning and decoding began after selection by the user. For instance, a television channel already tuned to and decoded may be presented to the user in a matter of less than a second after the user provides the channel up command. If the user is providing "channel down" commands, the television channels tuned to and decoded may be television channels having consecutive television channel numbers immediately fewer than the current television channel output for presentation. Until the television channel is actually selected for viewing by the user, the decoded output of the television channel may be discarded by the television receiver.

In some embodiments, the idle tuners and decoders may be used to predictively prepare television channels for presentation based on the television receiver predicting television channels that the user is likely to select. For instance, the most popular television channels at the time the user is watching television as determined by the television service provider may be used to select television channels. The viewing habits of the users of the television receiver may be monitored to determine the most popular television channels viewed at the television receiver. A category of television channels may be selected based on the programming of the currently presented television channel (e.g., sports). A user may provide a listing of favorite television channels. The previous television channel tuned to may be predicted as likely to be selected again (such as via a "recall" command issued by the user via a remote control).

The number of television channels prepared for viewing before selection by a user may be based on the number of idle tuners and decoding resources of an television receiver. For instance, if only one idle tuner is present in the television receiver, only one television channel may be prepared for viewing ahead of selection. If another user starts watching a television channel (e.g., via a different presentation device) or a timer for the television receiver's DVR indicates another television channel is to be recorded, the number of tuners available for preparing television channels for preparation for presentation may be decreased. Similarly, if another user ceases watching another television channel or a DVR of the television receiver ceases recording a television channel, the number of tuners and decoding resources available for preparing television channels for presentation may be increased.

In some embodiments, rather than decoding each television channel predictively selected, to preserve decoding resources, the received video data for the television channel from the tuner may be buffered. If the television channel is then selected by the user, the data buffered may be decoded and used for presentation. Such an arrangement may be particularly useful if MPEG video compression is used. Rather than having to wait for an I-frame to be received after the user has selected the television channel, the most recently received I-frame may be retrieved from the buffer and used for beginning presentation of the television channel to the user faster than if the I-frame was not buffered. For instance, such buffering may reduce the presentation delay by two seconds. In such arrangements, the most recent received I-frame for each television channel predictively selected may be buffered along with P- and B-frames received after the most recently received I-frame. Once a subsequent new I-frame is received, the previous I-frame and previous P- and B-frames may be discarded for that television channel. It should be understood that in some embodiments, some television channels may be decoded while other television channels may be buffered. For instance, if some decoding resources are available, some television channels may be decoded while other television channels may be buffered (in either scrambled or unscrambled form) and later decoded, if the television channel is selected for viewed. Whether or not buffered television channels are descrambled or not may be based on whether CA resources (e.g., sufficient processing by a smartcard configured to create the control words from an encrypted control message (e.g., an entitlement control message) to descramble the scrambled television channels and/or sufficient processing resources to use the decrypted control words to descramble the scrambled television channels) are available. If a buffered and scrambled television channel is selected, data buffered for the television channel may need to be descrambled prior to decoding. When selected, this television channel may be prioritized and allocated sufficient CA resources for decryption of the ECMs to obtain the control words and/or for descrambling using the control words.

Television channels predictively tuned to and decoded may be used to enhance an electronic programming guide (EPG) output for presentation by the set top box. A typical EPG may be displayed to a user via a presentation device (e.g., a television), and may indicate the television programming currently available on multiple television channels. For television channels that have been predictively tuned to and decoded using idle tuners and decoding resources, an indication of such television channels may be provided in the EPG. For instance, a still image of the television change (e.g., the most recent I-frame) may be presented near a listing of the television channel in the EPG. In some embodiments, video of the television channel may be displayed in the EPG. Whether a still image or video is presented, when viewing the EPG, the user may be able to determine: 1) which television channels are already prepared for viewing; and 2) which television channels are likely on commercial break (by looking at the displayed video or image for the television channel). In some embodiments, rather than presenting an image or video from the television channel, a graphical indicator may be presented that denotes the television channel has been prepared for presentation. Such an indicator may be used if the video of a television channel is buffered but not decoded.

FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as transponder streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink transponder streams 170 from transponder stream 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
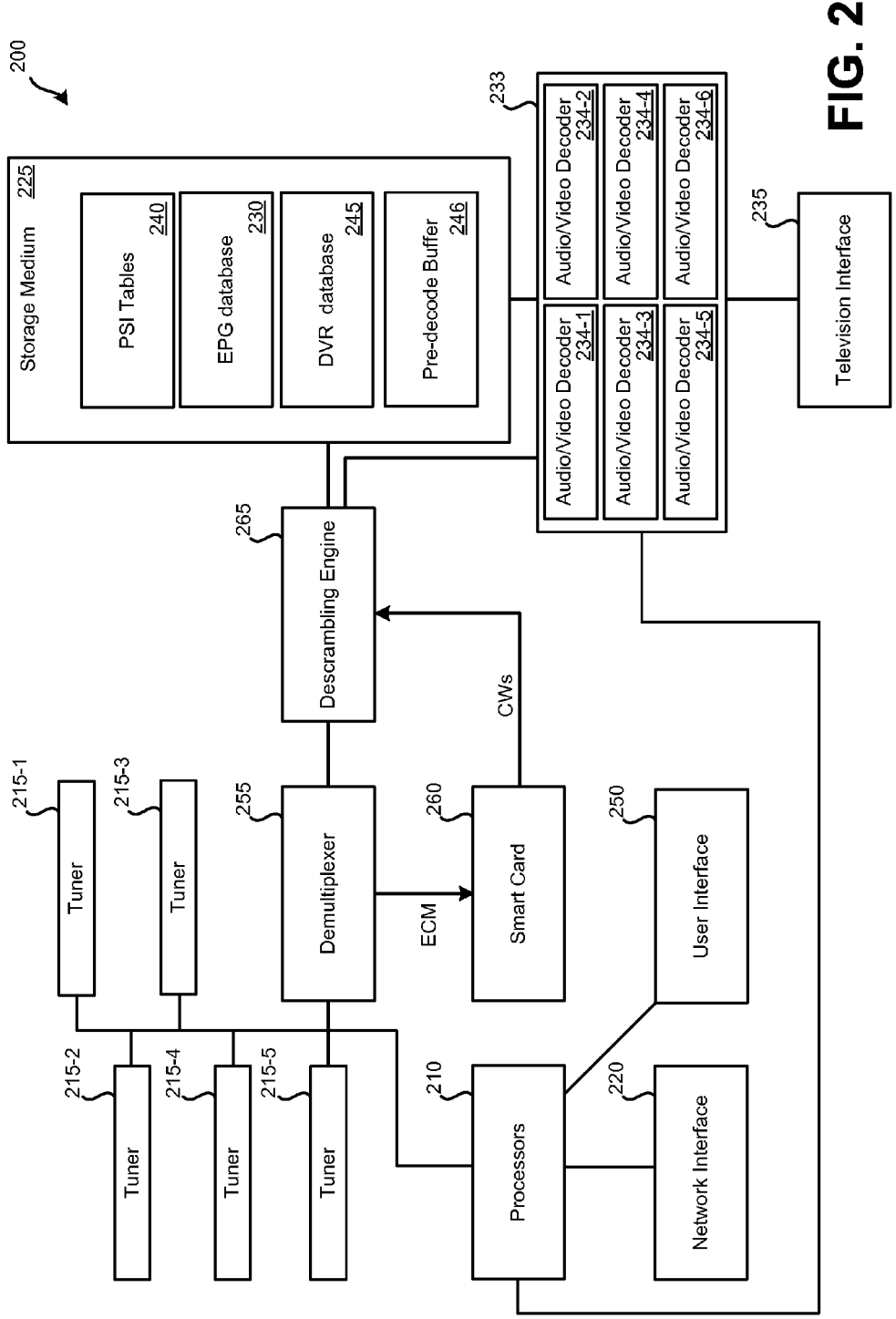
FIG. 2 illustrates an embodiment of a television receiver.

In communication with satellite dish 140, there may be one or more sets of receiving equipment. Receiving equipment may be configured to decode signals received from satellites 130 via satellite dish 140 for display on a display device, such as display device 160. Receiving equipment may be incorporated as part of a television receiver. Receiving equipment may include a satellite tuner configured to receive television channels via a satellite. In FIG. 1, receiving equipment is present in the form of television receiver 150 (which may be a set top box). As such, television receiver 150 may decode signals received via satellite dish 140 and provide an output to display device 160. FIG. 2 provides additional detail of receiving equipment.

Display device 160 may be used to present video and/or audio decoded by television receiver 150. Television receiver 150 may also output a display of one or more interfaces to display device 160, such as an electronic programming guide (EPG). In some embodiments, the display device may be a television, monitor, or other video display device.

Uplink transponder stream 170-1 represents a signal between satellite transmitter equipment 120 and satellite 130-1. Uplink transponder stream 170-2 represents a signal between satellite transmitter equipment 120 and satellite 130-2. Each of uplink transponder streams 170 may contain streams of one or more different television channels. For example, uplink transponder stream 170-1 may contain a certain group of television channels, while uplink transponder stream 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments, greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates a block diagram of an embodiment of a television receiver 200. Television receiver 200 may be a set top box or may represent components incorporated as part of a display device or functioning in communication with a display device. Television receiver 200 may be television receiver 150 of FIG. 1, or may be incorporated as part of a television, such as display device 160 of FIG. 1. Television receiver 200 may include: processors 210, tuners 215, network interface 220, non-transitory computer-readable storage medium 225, electronic programming guide (EPG) database 230, television interface 235, network information table (NIT) 240, digital video recorder (DVR) database 245, user interface 250, demultiplexer 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. For example, an EPG may be presented based on EPG database 230 may be executed by processors 210.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video and audio data from a particular format, such as MPEG, for output and display on a television and for performing decryption. It should be understood that the functions performed by various modules of FIG. 2 may be performed using one or more processors. As such, for example, functions of descrambling engine 265 may be performed by processors 210.

Tuners 215 may include multiple tuners used to tune to television channels, such as television channels transmitted via satellite or cable. Each tuner contained in tuners 215 may be capable of receiving and processing a stream of data from a satellite transponder (or a cable RF channel) at a given time. As such, a single tuner may tune to a transponder stream (or cable RF channel). Within tuners 215, one tuner (e.g., tuner 215-2) may be used to tune to a television channel on a first transponder for presentation using a television or recording using a DVR, while another tuner (e.g., tuner 215-5) may be used to tune to a television channel on a second transponder for recording and viewing at some other time. Still another tuner (e.g., tuner 215-1) may be used to check various television channels to determine if they are available for presentation or not (e.g., due to weather/satellite outages). If multiple television channels transmitted on the same transponder stream are desired, a single tuner of tuners 215 may be used to receive the signal containing the multiple television channels for presentation and/or recording. If a tuner of tuners 215 is not being used to tune to a transponder stream to receive a television channel for presentation and/or recording, the tuner may be considered idle. In some embodiments, a tuner may be a wideband tuner. A wideband tuner may be configured to be able to tune to multiple (e.g., two, three, or more) satellite transponders at the same time, thus receiving data streams from multiple satellite transponders.

Network interface 220 may be used to communicate via an alternate communication channel with a television service provider. For example, the primary communication channel may be via satellite (which may be unidirectional to the television receiver) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, PSI 240, DVR database 245 and/or pre-decode buffer 246. Recorded television programs may be stored using storage medium 225.

EPG database 230 may store information related to television channels and the timing of programs appearing on such television channels. EPG database 230 may be stored using non-transitory storage medium 225, which may be a hard drive. Data from EPG database 230 may be used to inform users of what television channels or programs are popular and/or provide recommendations to the user. EPG database 230 may provide the user with a visual interface displayed by a television that allows a user to browse and select television channels and/or television programs for viewing and/or recording via DVR database 245. Information used to populate EPG database 230 may be received via network interface 220 and/or via satellites, such as satellites 130 of FIG. 1 via tuners 215. For instance, updates to EPG database 230 may be received periodically via satellite. Data from EPG database 230 may serve as an interface for a user to control DVR functionality of the television receiver to enable viewing and/or recording of multiple television channels simultaneously.

If one or more idle tuners of tuners 215 and one or more idle audio/video decoders are being used to predictively prepare television channels for presentation, EPG may present indications of which television channels are prepared. Such an indication may be an icon or other graphical element. In some embodiments, the television channel may be indicated by a particular color. In some embodiments, a still image of the television channel (e.g., the last received I-frame) may be displayed in the vicinity of the listing of the television channel in the EPG when output for display. In some embodiments, video of the television channel may be displayed in the vicinity of the listing of the television channel in the EPG when output for display. Further detail is provided in relation to FIG. 8.

Audio/video decoder 233 may serve to convert encoded video and audio into a format suitable for output to a display device. For instance, audio/video decoder 233 may receive MPEG video and audio from storage medium 225 (e.g., DVR database 245 or pre-decode buffer 246) or descrambling engine 265 to be output to a television. Audio/video decoder 233 may convert the MPEG video and audio into a format appropriate to be displayed by a television or other form of display device and audio into a format appropriate to be output from speakers, respectively. Audio/video decoder 233 may be a single hardware element capable of decoding a finite number of television channels at a given time, such as in a time-division arrangement. Such finite decoding may be represented by each audio/video decoder submodule of audio/video decoder submodules 234 within audio/video decoder 233. In the illustrated embodiment, six television channels may be decoded concurrently. In some embodiments, rather than a single hardware element being used, each audio/video decoder submodule of audio/video decoder submodules 234 may be a separate piece of hardware. In some embodiments, a general purpose processor may be used for decoding.

In the illustrated embodiment, five tuners 215 and six audio/video decoder submodules 234 are illustrated. It should be understood that these numbers are for example purposes only: in other embodiments, greater or fewer numbers of tuners 215 and/or audio/video decoder submodules 234 may be present. The number of tuners may not necessarily match the number of audio/video decoder submodules 234. For instance, a single tuner may be able to receive multiple television channels as part of the same transponder stream; however, separate audio/video decoder submodules of audio/video decoder submodules 234 may be needed for each television channel to be decoded. Further, a tuner of tuners 215 may not be needed to decode programming stored in DVR database 245; however, an audio/video decoder of audio/video decoder submodules 234 may be needed to convert the programming into a proper format for output to television interface 235.

Television interface 235 may serve to output a signal to a television (or some other form of presentation device) in a proper format for display of video and playback of audio. As such, television interface 235 may output one or more television channels being received live, and/or stored television programming from storage medium 225 (e.g., DVR database 245 and/or information from EPG database 230) to a television for presentation.

The program specific information (PSI) tables 240 may store information used by television receiver 200 to access various television channels. PSI 240 may be stored using storage medium 225. Information used to populate PSI 240 may be received via satellite (or cable) through tuners 215 and/or may be received via network interface 220 from the television service provider. As such, information present in PSI 240 may be periodically updated. PSI 240 may be locally-stored by television receiver 200 using storage medium 225. Information that may be present in PSI 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, PSI 240 may be divided into additional tables, such as a Network Information Table (NIT), Program Association Table (PAT), Program Management Table (PMT), etc.

Table 1 provides a simplified example of PSI 240 for several television channels. It should be understood that in other embodiments, many more television channels may be represented in PSI 240. PSI 240 may be periodically updated by a television service provider. As such, television channels may be reassigned to different satellites and/or transponders, and television receiver 200 may be able to handle this reassignment as long as PSI 240 is updated.

TABLE 1

| Channel | Satellite | Transponder | ECM PID | Audio PIDs | Video PID |
|---|---|---|---|---|---|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in PSI 240. Video and/or audio for different television channels on different transponders may have the same PIDs. Such television channels may be differentiated based on which satellite and/or transponder to which a tuner is tuned.

Digital Video Recorder (DVR) functionality of television receiver 200 may permit a television channel to be recorded for a period of time. DVR database 245 may store timers that are used by processors 210 to determine when a television channel should be tuned to and recorded to DVR database 245 of storage medium 225. In some embodiments, a limited amount of storage medium 225 may be devoted to DVR database 245. Timers may be set by the television service provider and/or one or more users of the television receiver. DVR functionality of television receiver 200 may be configured by a user to record particular television programs. PSI 240 may be used to determine the satellite, transponder, ECM PID (packet identifier), audio PID, and video PID.

Pre-decode buffer 246 may be used in arrangements where television channels predicted as likely to be selected by a user are tuned to, but not decoded unless actually selected by the user. For each television channel being prepared for presentation, pre-decode buffer 246 may store at least some video data. For each television channel, the most recent I-frame may be stored. P- and B-frames received after the I-frame may also be stored. If a new I-frame is received for a television channel, the new I-frame may be stored and the previously stored frames for the television channel may be purged from pre-decode buffer 246. If the television channel is then selected for presentation, the currently stored I-frame and any P- and B-frames stored may be decoded and used for output to television interface 235. As such, if pre-decode buffer 246 is used, it may not be necessary to wait for a new I-frame of the television channel to be received before outputting video. The most recent I-frame may already be stored and may be used as the basis to begin presentation. Pre-decode buffer 246 may store video data that has already been descrambled or has yet to be descrambled. Whether or not the video data is descrambled may be based on whether sufficient CA resources are available.

User interface 250 may include a remote control (physically separate from television receiver 200) and/or one or more buttons on television receiver 200 that allow a user to interact with television receiver 200. User interface 250 may be used to select a television channel for viewing, to view EPG database 230, and/or to program DVR 245.

Referring back to tuners 215, television channels received via satellite (or cable) may contain at least some encrypted data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which in combination with PSI 240, can be determined to be associated with a particular television channel. Particular data packets, referred to as entitlement control messages (ECMs) may be periodically transmitted. ECMs may be encrypted; television receiver 200 may use smart card 260 to decrypt ECMs. Smart card 260 may function as the CA (controlled access), which performs decryption of encryption data to obtain control words that are used to descramble video and/or audio of television channels. Decryption of an ECM may only be possible if the user has authorization to access the particular television channel associated with the ECM.

When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 0.2-0.5 seconds, may elapse before the control words indicated by the ECM can be obtained. Smart card 260 may be permanently apart of television receiver 200 or may be configured to be inserted and removed from television receiver 200.

Demultiplexer 255 may be configured to filter data packets based on PIDs. For example, if a transponder data stream includes multiple television channels, data packets corresponding to a television channel that are not desired to be stored or displayed by the user may be ignored by demultiplexer 255. As such, only data packets corresponding to the one or more television channels desired to be stored and/or displayed may be passed to either descrambling engine 265 or smart card 260; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to PSI 240, may be appropriately routed by demultiplexer 255.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (as part of DVR database 245) and/or to audio/video decoder 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. Two modules not being directly or indirectly connected do not indicate the modules cannot communicate. Rather, connections between modules of the television receiver 200 are intended only to indicate possible common data routing. It should be understood that the modules of television receiver 200 may be combined into a fewer number of modules or divided into a greater number of modules.

Further, the components of television receiver 200 may be a part of another device, such as components built into a television or other presentation device configured to receive and convert television programming signals for presentation. Also, while television receiver 200 may be used to receive, store, and present television channels received via a satellite, it should be understood that similar components may be used to receive, store, and present television channels via a cable network.

Figure 3:
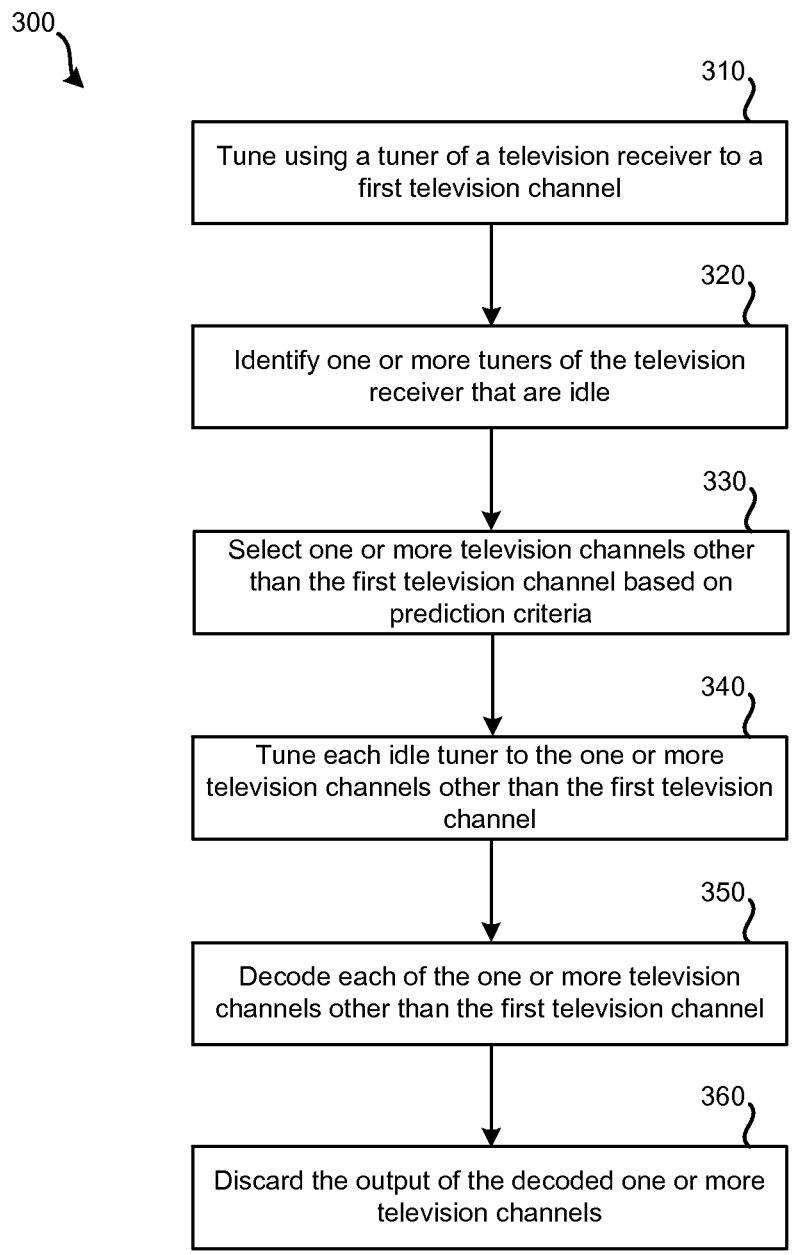
FIG. 3 illustrates an embodiment of a method for preparing one or more television channels for presentation.

The previously described satellite television distribution system and the television receiver may be used to perform various methods. FIG. 3 illustrates an embodiment of a method for preparing one or more television channels for presentation. Satellite television distribution system 100 of FIG. 1 may be used to perform method 300. Television receiver 200 of FIG. 2 may be used to perform method 300. Further, other embodiments of television distribution systems (e.g., a cable television distribution system) and television receivers may be configured to perform method 300. Some or all steps of method 300 may be performed using one or more computer systems. Means for performing the steps of method 300 include: one or more components of system 100, one or more components of television receiver 200, and/or one or more computer systems.

At step 310, a tuner of a television receiver may be tuned to a first television channel. This first television channel may have been selected by a user. For instance, the user may have entered into a remote control a television channel number that the user desires to view. The user may also have selected the first television channel by providing a channel up or channel down command that results in the first television channel being selected. This form of command may be provided via a remote control configured to communicate with the television receiver. The television receiver may assign a tuner of the television receiver to tune to a transponder stream that contains the first television channel. As previously detailed in relation to FIG. 2, using a network information table and/or one or more other related stored tables, the television receiver may be able to determine a proper transponder stream to which tuning is required and the data packets within the transponder stream corresponding to the television channel based on PIDs. In the instance of a satellite-based television system, the television receiver may use a network information table (NIT) to determine a proper satellite and/or transponder to which tuning is required to receive the transponder stream that contains the first television channel. Tuning to a particular transponder stream may involve the use of a single tuner. As such, if multiple television channels are desired to be presented and/or recorded from a single transponder stream, only a single tuner may be necessary to receive the transponder stream. If the first television channel is being output to a presentation device, such as a television, an audio/video decoding module (such as one of the audio/video decoding submodules of FIG. 2) may receive (descrambled) video/audio data packets that were received by the tuner and may convert the descrambled video/audio data packets to a format appropriate to be output to a presentation device. For instance, this may involve conversion from an MPEG format (or some other compressed video/audio format) to a format appropriate for output to a presentation device.

At step 320, one or more tuners of the television receiver may be identified that are idle. As detailed in relation to television receiver 200 of FIG. 2, a television receiver may have multiple tuners. While a tuner may be assigned to tune to the transponder stream containing a first television channel, other tuners of the television receiver may be idle. For example, if the television receiver has four tuners, the three tuners not being used to tune to the first television channel may be idle. An idle tuner may be defined as a tuner that is not being used to receive a transponder stream for presentation of a television channel via a presentation device or for recording of a television channel. For the remainder of the described embodiment of method 300, it is assumed that a total of four tuners are present and that three tuners are idle (with the remaining tuner being used to tune to the first television channel). Other numbers of tuners and numbers of available tuners may be present in other embodiments of method 300.

Additionally or alternatively, at step 320, the availability of audio/video decoding resources may be determined. For example, referring to television receiver 200 of FIG. 2, the number of audio/video decoder submodules 234 that are idle may be determined. An audio/video decoder submodule may be defined as idle when the audio/video decoder submodule is not being used to decode video and/or audio received from a DVR or descrambling engine.

At step 330, one or more television channels (other than the first channel already being output for presentation) may be selected based on the prediction criteria. These prediction criteria may specify television channels that are considered likely for a user to select for presentation. Various forms of prediction criteria are detailed in reference to FIG. 4. At step 330, the number of television channels selected based on the prediction criteria may be based on the number of tuners that were identified as idle at step 320. For example, if three tuners were identified as idle, then three television channels may be selected at step 330; if one television tuner was identified as idle at step 320, then a single television channel may be selected at step 330. If no idle television tuners are available, method 300 may end at step 330. In some embodiments, the number of audio/video decoder submodules available for use for decoding may also be used to determine the number of television channels selected based on the prediction criteria. In some embodiments, whichever module (tuners or decoders) has less idle time will serve as the limiting factor for the number of television channels selected at step 330. For example, if three tuners are idle but only two audio/video decoder submodules are idle, then only two television channels may be selected at step 330 for preparation.

At step 340, each of the idle tuners identified at step 320 may tune to a television channel of the one or more television channels selected at step 330. Accordingly, each tuner previously identified as idle may tune to a different television channel of the one or more television channels. If only a single idle television tuner was identified, then only a single television channel (which is different than the first television channel) may be tuned to. For this exemplary embodiment, since three idle tuners were identified at step 320, three transponder streams containing three television channels were identified at step 330 based on the prediction criteria. Therefore, at step 340, the three tuners identified as idle are each tuned to a different channel of the three television channels selected at step 330.

At step 350, each of the one or more television channels tuned to at step 340 may be decoded. This decoding may use audio/video decoding resources, which may be implemented in the television receiver as individual hardware-based audio/video decoding integrated circuits (ICs) or as a single hardware-based audio/video decoding IC which can handle multiple television channels on a time division basis. As detailed in relation to television receiver 200 of FIG. 2, audio/video decoder submodules 234 of audio/video decoder 233 may be used for decoding. Such decoding may involve conversion from an MPEG format to a format appropriate for output to a presentation device.

While the one or more television channels are tuned to and decoded, at this point, a user may not have selected any of the one or more television channels for presentation. As such, the tuning at step 340 and the decoding at step 350 may be invisible to the user. In other words, the video/audio decoded at step 350 may not be output to a presentation device or stored using a DVR. Rather, received audio/video data may be temporarily buffered, decoded for output, then discarded. As such, rather than outputting to a presentation device, the output may be discarded without output for presentation or recording.

Temporary buffering may occur as part of the audio/video decoding process. For instance, if MPEG video compression is used, not every video frame contains sufficient information for presentation. Rather, only periodically, such as every few seconds, is a video frame transmitted that contains data on a pixel-by-pixel basis that permits for decoding without additional information. An I-frame (intra-frame) can be decoded independently of other frames. P-frames (predicted frames) store only a difference in an image from the previous P-frame or I-frame. Therefore, information from at least the previous I-frame is required and the P-frame cannot be decoded independently of other frames. Similarly, a B-frame (bidirectional frame) is based on a previous frame and a future frame. Thus to use a B-frame at least the previous I-frame is required and the B-frame cannot be decoded independently of at least two separate frames. The temporary buffering that may occur for each television channel may involve storing an I-frame and subsequent P- and B-frames until the next I-frame is received. Once the next I-frame is received, all previous frames for the television channel are purged from the buffer and the process repeats. Accordingly, the most recent I-frame and subsequent P- and B-frames are decoded. Therefore, while initially at step 350, the television channel is not output for presentation. If a channel change is executed by the user via the television receiver to select the television channel, the necessary previously-received I-frame has already been received and decoded and may serve as the basis for presentation of the television channel until the next new I-frame is received. Similarly, P- and B-frames received after the initial I-frame may also be used as the basis data for initial presentation of the television channel until the new I-frame is received. It should be noted that some frames, such as B-frames, may be transmitted and received out of order. As such, a frame that is used for presentation after an I-frame (e.g., an out-of-order B-frame) that is received before the I-frame should not be deleted when the I-frame is received. Rather, only frames that do not affect presentation after the I-frame should be deleted from the buffer when the new I-frame is received.

The output from the audio/video decoder submodule performing such decoding functions may be discarded at step 360. Such discarding may continue until the user selects one of the television channels of the one or more television channels for presentation. Once selected, an output from the audio/video decoder submodule may no longer be discarded but may rather be output to the presentation device for viewing by the user. At least some of the video decoded before the user selected the television channel may be used for output of the television channel for presentation. If the user never selects a particular television channel of the one or more television channels, none of the output from the audio/video decoder submodule decoding the television channel may be presented, stored, or otherwise output by the television receiver. However, while the decoded television channel may never be output, nothing is wasted (except, perhaps some power) since the tuner and audio/video decoding module used for the television channel were otherwise idle.

Figure 4:
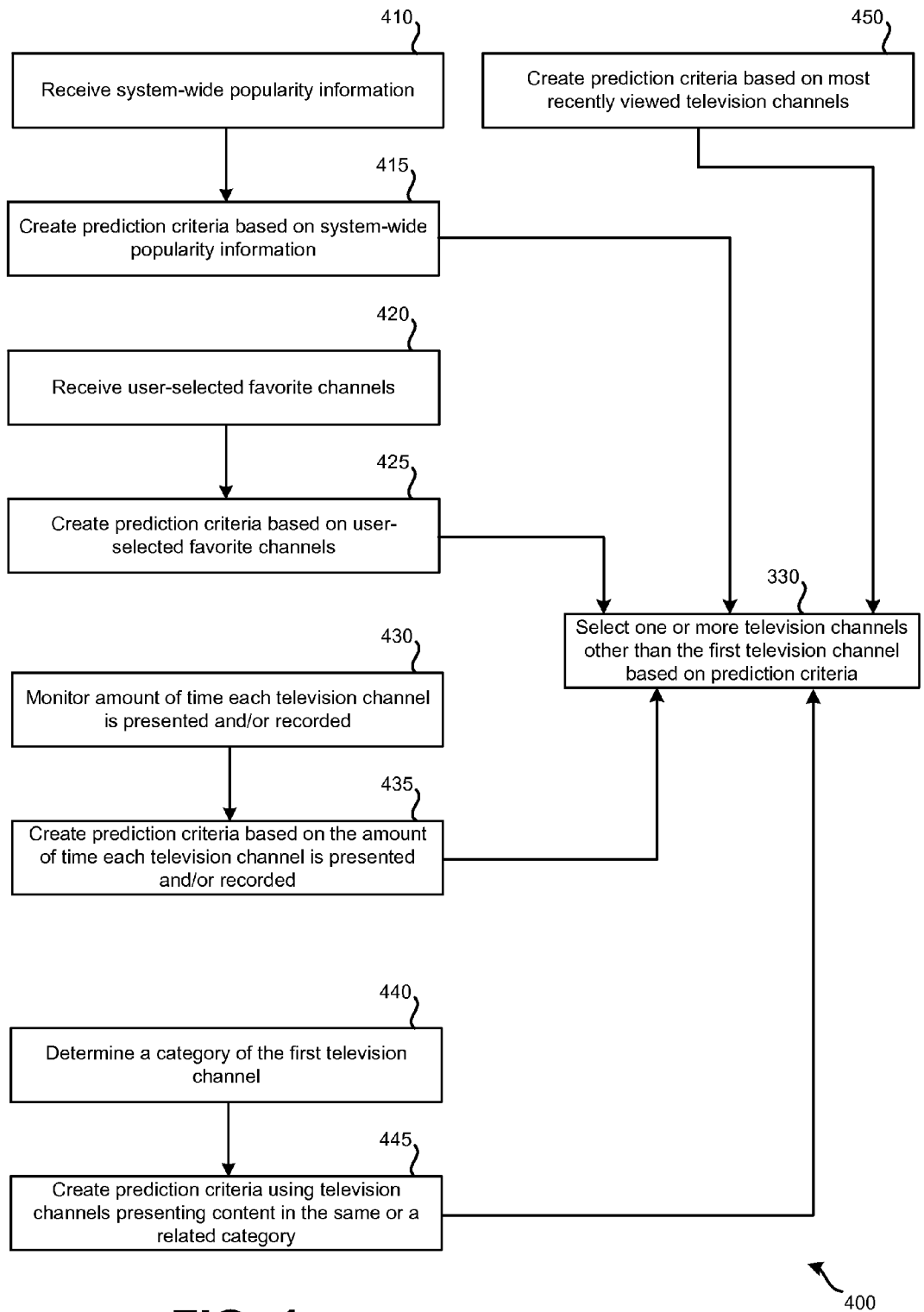
FIG. 4 illustrates an embodiment of a method for selecting one or more television channels for preparation for presentation.

The previously described satellite television distribution system and the television receiver may be used to perform various methods. FIG. 4 illustrates an embodiment of a method for selecting one or more television channels for preparation for presentation.

Satellite television distribution system 100 of FIG. 1 may be used to perform method 400. Television receiver 200 of FIG. 2 may be used to perform method 400. Further, other embodiments of television distribution systems (e.g., a cable television distribution system) and television receivers may be configured to perform method 400. Some or all steps of method 300 may be performed using one or more computer systems. Means for performing the steps of method 400 include: one or more components of system 100, one or more components of television receiver 200, and/or one or more computer systems. Method 400 may be performed as part of method 300 or some other method for preparing one or more television channels for presentation.

At step 330 in method 300 of FIG. 3, one or more television channels are selected that are different than the first television channel tuned to at step 310. Various ways for selecting the one or more television channels are present. Such selection may be based on prediction criteria. In some embodiments, prediction criteria may be based on popularity of television channels. At step 410, a television receiver may periodically receive popularity information about various television channels. For instance, this popularity information may be for particular time periods corresponding to particular television programs. This system-wide popularity information, which may be based on usage data gathered from multiple television receivers operated by different users and compiled by the television service provider, may be used at step 415 to create prediction criteria that indicate television channels considered likely to be selected by the user for presentation based on this system-wide popularity. If the first television channel is one of the television channels indicated to be the most popular by the system-wide popularity information, this television channel may be skipped in favor of the next most popular television channel (as such the first television channel may be prevented from being selected twice). Depending on the number of tuners and audio/video decoding resources available, the number of television channels selected using the prediction criteria at step 330 may be varied accordingly.

At step 420, a listing of favorite channels may be received from the user. The television receiver may store this listing of favorite channels. At step 425, production criteria may be created based on these user-selected favorite television channels. Depending on the number of tuners and audio/video decoding resources available, the number of television channels selected using the prediction criteria at step 330 may be varied. If the first television channel is one of the television channels indicated as a user-favorite, this first television channel may be skipped in favor of another user-favorite television channel (as such the first television channel may be prevented from being selected twice).

At step 430, the television receiver may monitor the amount of time television channels are presented and/or recorded by the television receiver. As such, a table, or some other storage arrangement, may be maintained that indicates the most requested television channels at the television receiver. At step 435, the prediction criteria may be created based on the amount of time each television channel is presented and/or recorded at the television receiver. As such, at step 330, the most watched and/or the most recorded television channels may be selected as the one or more television channels. Depending on the number of tuners and audio/video decoding resources available, the number of television channels selected using the prediction criteria at step 330 may be varied accordingly. If the first television channel is one of the television channels indicated as most watched and/or recorded using the television receiver, this television channel may be skipped in favor of the next most popular television channel (as such the first television channel may be prevented from being selected twice).

At step 440, a category of the first television channel may be determined. The category may be based on the television channel or the particular programming being currently shown on the television channel. For example, the category may be: sports, news, movies, drama, shopping, travel, food, music, reality TV, etc. At step 445, the prediction criteria may indicate television channels of the same or related category. Such an arrangement may be useful because if a user is watching a television program within a particular category, the user may be more likely to switch to another television channel carrying content in the same category. For example, the user may be likely to switch between football games appearing on different television channels. Depending on the number of tuners and audio/video decoding resources available, the number of television channels selected using the prediction criteria at step 330 may be varied accordingly.

At step 450, prediction criteria may be based on the most recently viewed television channels. For example, many remote controls associated with television receivers have a "recall" or "last channel" button. A user may be likely to switch back to the most recent or previously presented television channel. As such, one or more previously presented television channels may be used for prediction criteria to select the one or more television channels.

In other embodiments, prediction criteria may be based on the user's use of a "channel up" or "channel down" command, such as by pushing associated buttons on a remote control. Such an arrangement is detailed in relation to method 500.

In method 400, various ways of determining prediction criteria used to select one or more television channels are presented. The various ways for determining prediction criteria may be used individually or in various combinations. For example, if three idle tuners are present, two idle tuners may be dedicated to popular channels determined on a system-wide basis (step 415), while one tuner is used for the previously viewed channel (step 450). As should be understood, many other variations and combinations of the various ways for determining prediction criteria may be used in embodiments of method 400. Further, while method 400 identifies various ways in which step 330 may be performed to select the one or more television channels, method 400 may also be applied to other methods, such as methods 500, 600, and/or 700 in order to determine the one or more television channels.

Figure 5:
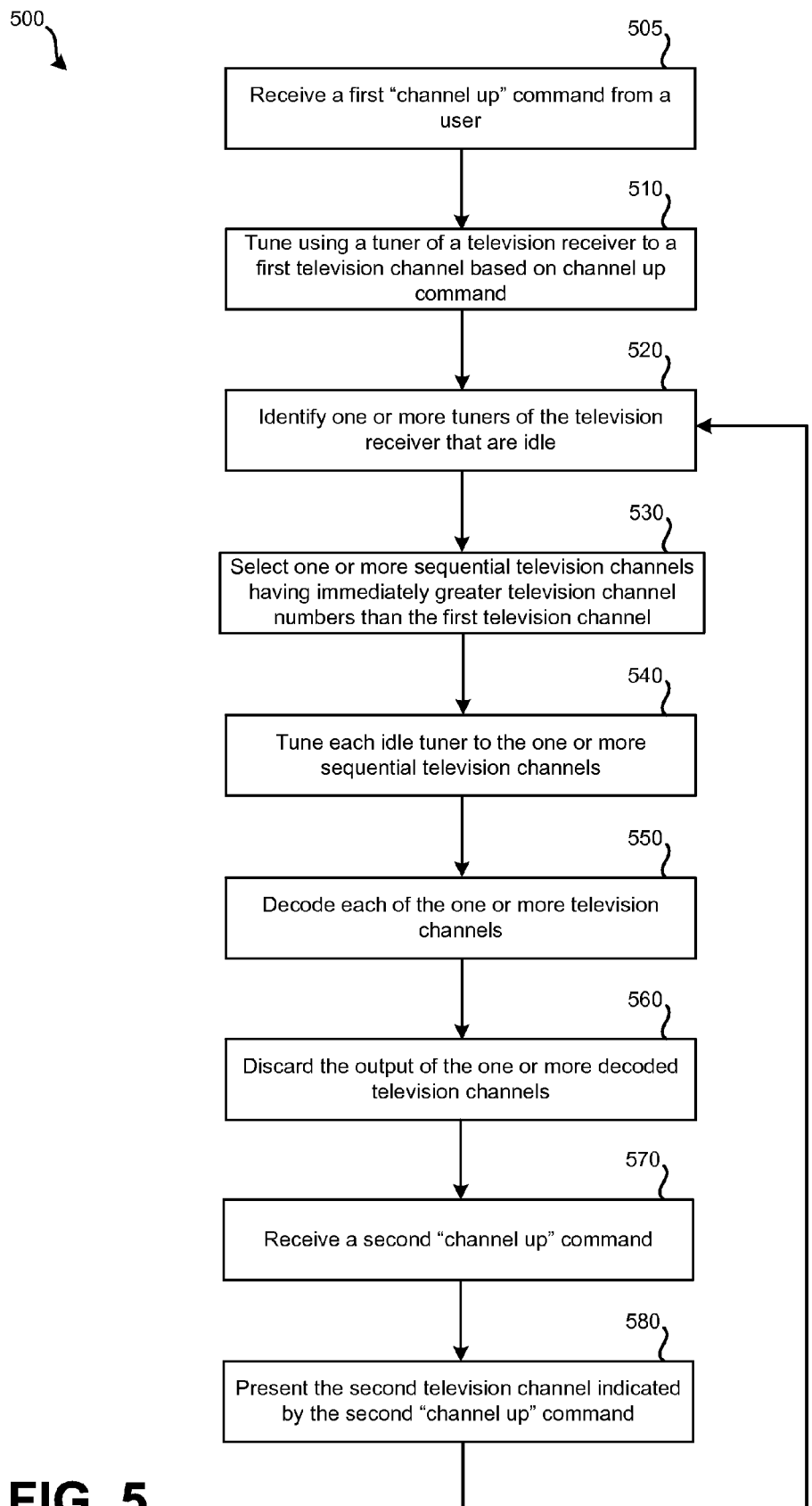
FIG. 5 illustrates an embodiment of a method for preparing one or more television channels for presentation during channel surfing.

FIG. 5 illustrates an embodiment of method 500 for preparing one or more television channels for presentation during channel surfing. Satellite television distribution system 100 of FIG. 1 may be used to perform method 500. Television receiver 200 of FIG. 2 may be used to perform method 500. Further, other embodiments of television distribution systems (e.g., a cable television distribution system) and television receivers may be configured to perform method 500. Some or all steps of method 500 may be performed using one or more computer systems. Means for performing the steps of method 500 include: one or more components of system 100, one or more components of television receiver 200, and/or one or more computer systems. Method 500 may represent a more detailed embodiment of method 300 of FIG. 3.

Method 500 is generally directed to a situation where a user provides "channel up" commands. It should be understood that method 500 may be modified to perform similar steps in response to a "channel down" command. Further, while method 500 is directed to a user channel surfing by using channel up and channel down commands, it should be understood that the prediction criteria of method 400 may additionally or alternatively be used to select some or all of the one or more television channels.

At step 505, a first "channel up" command may be received by the television receiver. This command may be received based on a user pressing a "channel up" button on a remote control in communication with the television receiver. At step 510, in response to the "channel up" command, a tuner of the television receiver may be tuned to a first television channel. This first television channel may have a channel number that is the next greater available television channel from the previously tuned to television channel. For instance, if television channel number 26 was previously selected for presentation, the channel up command may result in channel number 27 being selected. The television receiver may assign a tuner of the television receiver to tune to a transponder stream that contains the first television channel. As previously detailed in relation to FIG. 2, using a network information table and/or one or more other related stored tables, the television receiver may be able to determine a proper transponder stream to which tuning is required and the data packets within the transponder stream corresponding to the television channel based on PIDs. If two television channels have consecutive television channel numbers, in a satellite television distribution network, these television channels may not necessarily be part of the same transponder stream and may be transmitted using different transponders and/or satellites. In the instance of a satellite-based television system, the television receiver may use a network information table (NIT) to determine a proper satellite and/or transponder to which tuning is required to receive the transponder stream that contains the first television channel. Tuning to a particular transponder stream may involve the use of a single tuner. As such, if multiple television channels are desired to be presented and/or recorded from a single transponder stream, only a single tuner may be necessary to receive the transponder stream. If the first television channel is being output for presentation to a presentation device, such as a television, an audio/video decoding module (such as one of the audio/video decoding submodules of FIG. 2) may receive (descrambled) video/audio data packets that were received by the tuner and may convert the descrambled video/audio data packets to a format appropriate to be output to a presentation device. For instance, this may involve conversion from an MPEG format (or some other compressed video/audio format) to a format appropriate for output to a presentation device.

At step 520, one or more tuners of the television receiver may be identified that are idle. While a tuner may be assigned to tuning to the transponder stream containing a first television channel, other tuners of the television receiver may be idle. Additionally or alternatively, at step 520, the availability of audio/video decoding resources may also be identified.

At step 530, one or more television channels (other than the first channel already being output for presentation) may be selected. Since a "channel up" command was received at step 505, the television channels selected at step 530 may be sequential television channels having immediately greater television channel numbers than the first television channel. As an example, if a channel up command is received that results in the first channel being television channel number 27, idle tuners may be assigned to television channel numbers 28, 29, and 30. In some embodiments, television channels unavailable to the television receiver are skipped. (In embodiments involving a "channel down" command being received, the television channels selected at step 530 may be sequential television channels having immediately lower television channel numbers than the channel number of the first television channel).

At step 530, the number of television channels selected may be based on the number of tuners that were identified as idle at step 320. For example, if three tuners were identified as idle, then three television channels may be selected at step 530; if one television tuner was identified as idle at step 520, then a single television channel may be selected at step 530. If no idle television tuners are available, method 500 may end at step 530. In some embodiments, the number of audio/video decoder submodules available for use in decoding may additionally or alternatively be used to determine the number of television channels that are prepared for viewing. In some embodiments, whichever module has less idle time will serve as the limiting factor for the number of television channels selected at step 530. For example, if four tuners are idle but only two audio/video decoder submodules are idle, then only two television channels may be selected at step 530.

At step 540, each of the idle tuners identified at step 520 may tune to a television channel of the one or more sequential television channels selected at step 530. Accordingly, each tuner previously identified as idle may tune to a different television channel of the one or more television channels. If more than one of the television channels are transmitted to the television receiver as part of the same transponder stream, only a single tuner may be needed to tune to the transponder stream.

At step 550, each of the one or more television channels tuned to at step 550 may be decoded. This decoding may use audio/video decoding resources, which may be implemented in the television receiver as individual hardware-based audio/video decoding integrated circuits (ICs) or as a single hardware-based audio/video decoding IC which can handle multiple television channels on a time division basis. As detailed in relation to television receiver 200 of FIG. 2, audio/video decoder submodules 234 of audio/video decoder module 233 may be used for decoding. Such decoding may involve decoding from an MPEG format to a format appropriate for output to a presentation device.

The output from the audio/video decoder submodule performing such decoding functions may be discarded at step 560. Such discarding may continue until the user selects one of the television channels of the one or more television channels for presentation. This selection may occur if the user again provides a "channel up" command. Once selected, the output from the audio/video decoder submodule of at least one of the one or more television channels may no longer be discarded but may rather be output to the presentation device for viewing by the user. If the user never selects a particular television channel of the one or more television channels, none of the output from the audio/video decoder submodule decoding the television channel may be presented, stored, or otherwise output by the television receiver.

At step 570, a second "channel up" command may be received. This command may be received based on a user pressing a "channel up" button on a remote control in communication with the television receiver. Since the one or more channels are sequential and immediately greater than the first television channel, the television channel selected based on the user's command is one of the one or more television channels. At step 580, the television channel was readied for presentation by tuning to the appropriate transponder stream and performing any necessary decryption (of ECMs), descrambling (using CWs obtained from the ECMs), and decoding the audio/video packets of the television channel.

As such, at least one I-frame may have already been received and decoded. Such decoding which occurred before the second channel up command was received may be used for presentation of the now selected television channel. Accordingly, output of the decoded television channel to a presentation device occurs sooner than if the television channel indicated by the second "channel up" command was tuned to and decoded after receiving the command.

Following step 580, method 500 may at least partially repeat to become prepared for another "channel up" command. Since changing to outputting the second television channel, the tuner used to tune to the first television channel may now be idle. This tuner may now be assigned to tune to the next sequential television channel not already tuned to. An example of this is illustrated in FIG. 5B.

Figure 5B:
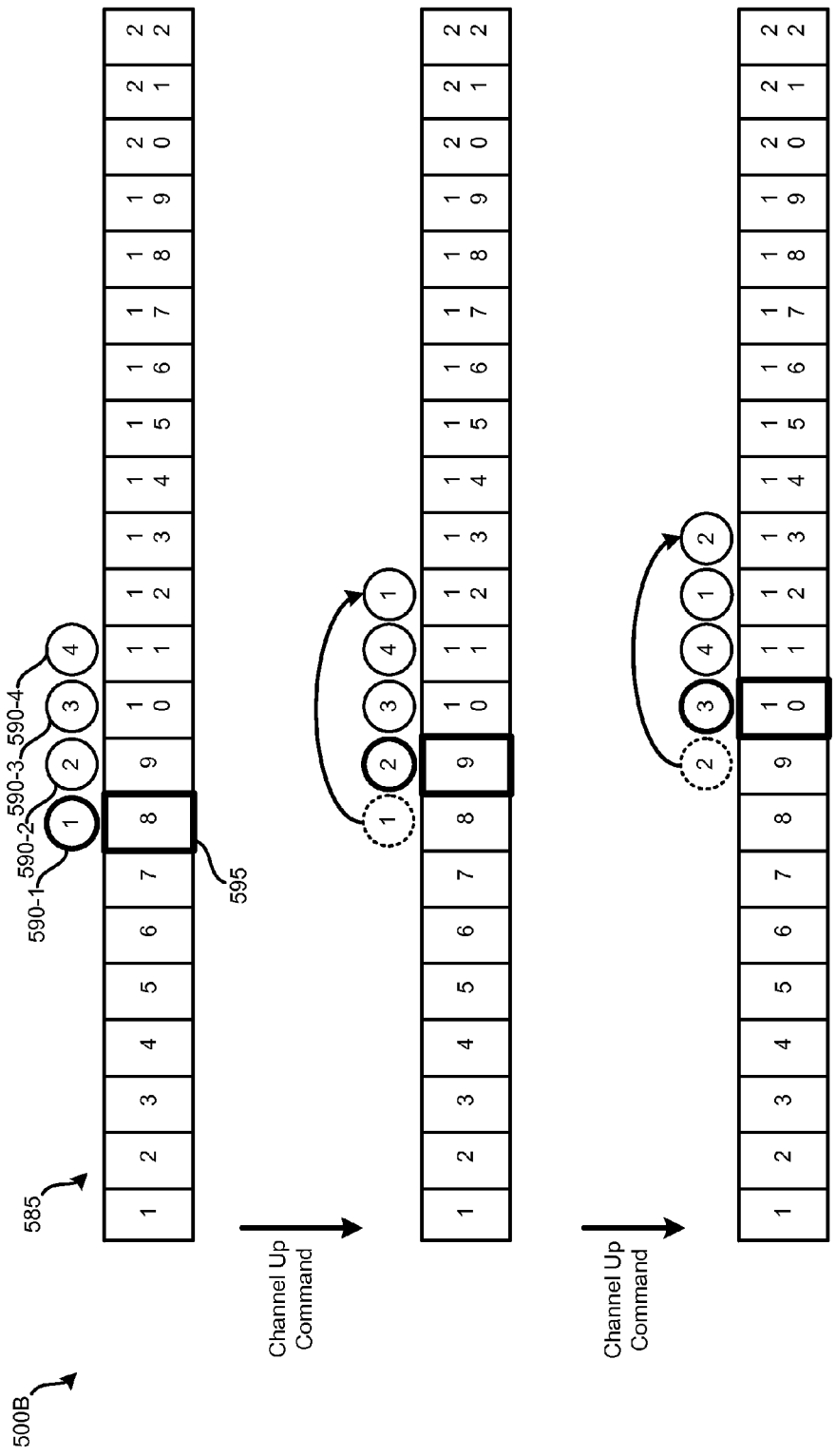
FIG. 5B is a graphical representation of an embodiment of method 500.

FIG. 5B is a graphical representation 500B of an embodiment of method 500. In FIG. 5B, television channels 585 are illustrated, which include television channel numbers one through twenty-two. Decoding Resources 590, of which there are four, are represented by circles. Each circle of decoding resources 590 in FIG. 5B represents a tuner and an audio/video decoding submodule. The television channel number directly below a decoding resource of decoding resources 590 represents that the decoding resource is tuned to the transponder stream containing the television channel and is decoding the television channel. As such, initially, the first tuner is tuned to the transponder stream containing channel 8, the currently presented television channel 595. Selection of channel 8 (indicated by the bolded box of television channel 8) may be based on a channel up command being received by the television receiver. In this embodiment, three idle tuners were identified. As such, the next three sequential television channel numbers (9, 10, and 11) are prepared for viewing using decoding resources 2, 3, and 4. At this point, the output from decoding resource 590-1 is output to a presentation device for presentation to a user. The output of decoded television channels 9, 10, and 11 from decoding resources 590-2, 590-3, and 590-4 are discarded.

An amount of time may elapse, then another channel up command may be received. Following another channel up command, television channel 9 is now selected for output for presentation. As such, the output from decoding resource 590-2 is output to a presentation device for presentation to a user. The output from decoding resources 590-1, 590-3, and 590-4 are discarded. Since decoding resource 590-1 is now idle, it may be reassigned to the next greater sequential television channel not already prepared for viewing. In this example, that television channel is television channel 12. Depending on the amount of time that decoding resource 590-2 was tuned to television channel 8, when the channel up command is received that results in television channel 9 being selected, television channel 9 may be ready for presentation.

An amount of time may elapse, then another channel up command may be received. Following another channel up command, television channel 10 is now selected. As such, the output from decoding resource 590-3 is output to a presentation device for presentation to a user. The output from decoding resources 590-1, 590-2, and 590-4 may be discarded. Since decoding resource 590-2 is now idle, it may be reassigned to the next greater sequential television channel not already prepared for viewing. In this example, that television channel is television channel 13. Depending on the amount of time that decoding resource 590-3 was tuned to television channel 9, when the channel up command is received that results in television channel 10 being selected, television channel 10 may be ready for presentation. It may be even more likely that television channel 10 is ready for presentation than television channel 9 because decoding resource 590-3 has been preparing television channel 10 for presentation at least since television channel 8 was output for presentation (while decoding resource 590-2 may also only have been preparing television channel 9 at least since television channel 8 was output for presentation).

Such steps may continue to repeat as channel up commands are provided by a user to the television receiver. It should be understood that the television channels selected for preparation before viewing may be selected based on additional factors, rather than just sequentially. For instance, if a particular television channel is not available (e.g., not part of the user's subscription), the television channel may be skipped for preparation. If the highest available channel number is reached, the decoding resources may "wrap-around" and prepare the lowest available channel number. It should be understood that while FIG. 5B is directed to a channel up command, similar principles may be applied in response to a channel down command. If multiple television channels can be prepared for presentation, at least one channel "above" and one channel "below" the currently displayed television channel may be prepared.

Figure 5C:
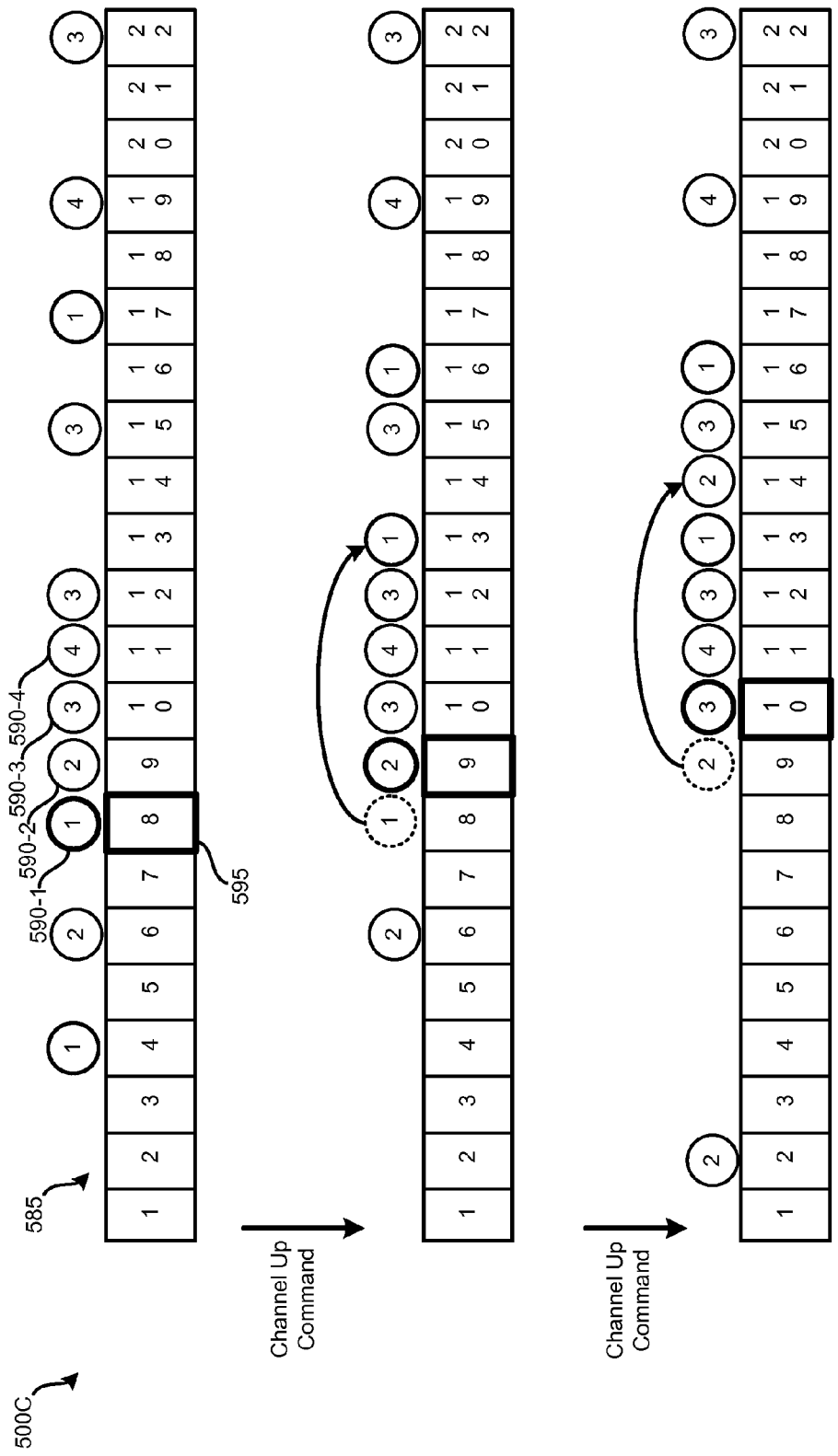
FIG. 5C is a graphical representation of an embodiment of method 500 in which multiple television channels captured using each tuner are prepared for presentation.

FIG. 5C is a graphical representation 500C of an embodiment of method 500 in which multiple television channels captured using each tuner are prepared for presentation. While consecutive television channels may be prepared for viewing, other channels that happen to be received as part of the same transponder streams may also be prepared for presentation. In FIG. 5C, television channels 585 are again illustrated, which include television channel numbers one through twenty-two. In FIG. 5C, decoding resources 590, of which there are four, are represented by circles and each represent a tuner and audio/video decoding submodule. A separate audio/video decoding submodule may need to be assigned to each television channel being tuned to (for example, while a single tuner may receive television channels 8 and 4, two audio/video decoding submodules may be necessary for both television channels to be decoded). The television channel number directly below a decoding resource of decoding resources 590 represents that the decoding resource is tuned to the transponder stream containing the television channel and decoding. Since a tuner may receive multiple television channels as part of the same transponder stream, a single tuner may receive multiple television channels. As such, initially, the first tuner is tuned to the transponder stream containing channel 8. Selection of channel 8 (indicated by the bolded box of television channel 8) may be based on a channel up command that was received by the television receiver. Other channels may be transmitted as part of the same transponder stream as channel 8, the currently presented television channel 595. In the illustrated embodiment, television channels 4 and 17 happen to be transmitted as part of the same transponder stream as television channel 8 and are indirectly selected for preparation for presentation. Such channels may also be decoded using available idle audio/video decoding submodules.

In this embodiment, three idle tuners (and/or at least that number of audio/video decoding submodules) were identified. As such, the next three sequential television channel numbers (9, 10, and 11) are tuned to using decoding resources 2, 3, and 4. Likewise, the other television channels that are indirectly selected by happening to be transmitted on the same transponder streams as television channels 9, 10, and 11 may be tuned to and decoded. At this point, the output from decoding resource 590-1 of channel 8 is output to a presentation device for presentation to a user. Television channels 4 and 17 may be decoded but may not be output unless selected by the user. The output from decoding resources 590-2, 590-3, and 590-4 may also be decoded and then discarded (because these channels are not selected for output to a presentation device).

An amount of time may elapse, then another channel up command may be received by the television receiver from the user. Following another channel up command, television channel 9 may now be selected. As such, the output from decoding resource 590-2 of channel 9 is output to a presentation device for presentation to a user. The output from decoding resources 590-3 and 590-4 continues to be discarded (regardless of whether decoded or not). Since decoding resource 590-1 is now idle, it may be reassigned to the next sequential television channel that is not already prepared for viewing. In this example, that television channel is television channel 12. Since tuner 590-3 was already tuned to the transponder stream having television channel 12, television channel 12 was skipped and tuner 590-1 was assigned to television channel 13. Since a new transponder stream is being received by tuner 590-1, the other television channels received as part of the transponder stream also changes. As such, instead of television channel 4 also be received, for example, television channel 16 is received. Depending on the amount of time that decoding resource 590-2 has been tuned to and decoding television channel 9, when the channel up command is received that results in television channel 9 being selected, television channel 9 may be ready for presentation.

At this point, if the user happens to select one of channels 6, 15, 16, 19, or 22, these channels may already be prepared for presentation (or in the process of being prepared for presentation). As such, by the user happening to select a television channel transmitted in the same transponder stream as a television channel that was predicted to likely to be selected, this "indirectly" predicted television channel may be prepared for presentation.

An amount of time may elapse, then another channel up command may be received. Following another channel up command, television channel 10 is now selected. As such, the output from decoding resource 590-3 is output to a presentation device for presentation to a user. The output from decoding resources 590-1 and 590-4 are discarded. Since decoding resource 590-2 is now idle, it may be reassigned to the next sequential television channel not already prepared for viewing. In this example, that television channel is television channel 14. Since a different transponder stream is now selected, the other television channels available in the transponder stream may also change. As such, now television channel 2 is tuned to instead of television channel 6. Television channel 2 may be decoded in case the user happens to select television channel 2 for viewing. Depending on the amount of time that decoding resource 590-3 was tuned to television channel 10, when the channel up command is received that results in television channel 10 being selected, television channel 10 may be ready for presentation. It may be even more likely that television channel 10 is ready for presentation than television channel 9 because decoding resource 590-3 has been preparing television channel 10 for presentation at least since television channel 8 was output for presentation (while decoding resource 590-2 may only have been preparing television channel 9 at least since television channel 8 was output for presentation).

Such steps may continue to repeat as channel up commands are provided by a user. It should be understood that the television channels selected for preparation before viewing may be selected based on additional factors, rather than just sequentially. For instance, if a particular television channel is not available (e.g., not part of the user's subscription), the television channel may be skipped for preparation. If the highest available channel number is reached, the decoding resources may "wrap-around" and prepare the lowest available channel number. Possibly depending on the availability of decoding resources, indirectly selected television channels may or may not be decoded prior to selection for presentation by a user. Rather, such indirectly selected television channels may be buffered. It should be understood that while FIG. 5C is directed to a channel up command, similar principles may be applied in response to a channel down command and/or other forms of channel surfing or jumping by a user. Further, while FIGS. 5B and 5C are directed to television channels being tuned to and decoded in preparation for possible presentation, such embodiments may be directed to buffering without decoding before user selection of the television channel is received, as detailed in relation to methods 600 and 700.

Figure 6:
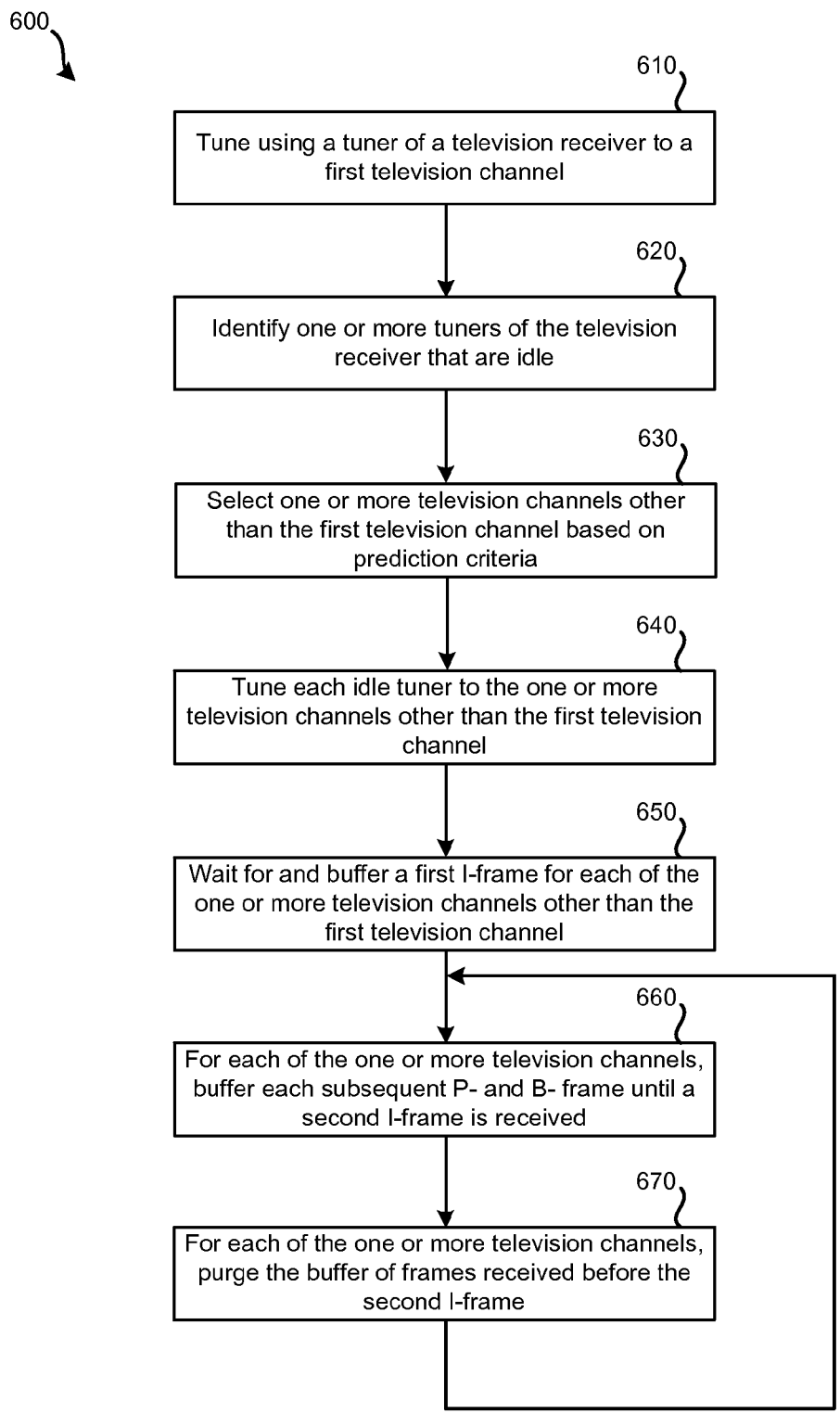
FIG. 6 illustrates an embodiment of a method for preparing one or more television channels for presentation without anticipatory decoding.

While FIGS. 4, 5, 5B, and 5C are directed to arrangements in which television channels are prepared for presentation by tuning to the associated transponder stream and decoding the received video from a compressed video format, in some embodiments, the video may be buffered, but not decoded, unless the television channel is specifically selected for presentation by the user. Such embodiments may reduce the amount of audio/video decoding resources needed for preparing television channels for presentation. FIG. 6 illustrates an embodiment of method for preparing one or more television channels for presentation without preemptory decoding (that is, without decoding before the user has selected the television channel for output for presentation). Satellite television distribution system 100 of FIG. 1 may be used to perform method 600. Television receiver 200 of FIG. 2 may be used to perform method 600. Further, other embodiments of television distribution systems (e.g., a cable television distribution system) and television receivers may be configured to perform method 600. Some or all steps of method 600 may be performed using one or more computer systems. Means for performing the steps of method 600 include: one or more components of system 100, one or more components of television receiver 200, and/or one or more computer systems.

At step 610, a tuner of a television receiver may be tuned to a first television channel. This first television channel may have been selected by a user. For instance, the user may have entered into a remote control a television channel number that the user desires to view. The user may also have selected the first television channel by providing a channel up or channel down command such that results in the first television channel being selected. This form of command may be provided via a remote control configured to communicate with the television receiver. The television receiver may assign a tuner of the television receiver to tune to a transponder stream that contains the first television channel. As previously detailed in relation to FIG. 2, using a network information table and/or one or more other related stored tables, the television receiver may be able to determine a proper transponder stream to which tuning is required and the data packets within the transponder stream corresponding to the television channel based on PIDs. In the instance of a satellite-based television system, the television receiver may use a network information table (NIT) to determine a proper satellite and/or transponder to which tuning is required to receive the transponder stream that contains the first television channel. Tuning to a particular transponder stream may involve the use of a single tuner. As such, if multiple television channels are desired to be presented and/or recorded from a single transponder stream, only a single tuner may be necessary to receive the transponder stream. If the first television channel is being output for presentation device, such as a television, an audio/video decoding module (such as one of the audio/video decoding submodules of FIG. 2) may receive (descrambled) video/audio data packets that were received as scrambled by the tuner and may convert the now descrambled video/audio data packets to a format appropriate to be output to a presentation device. For instance, this may involve conversion from an MPEG format (or some other compressed video/audio format) to a format appropriate for output to a presentation device.

At step 620, one or more tuners of the television receiver may be identified as idle. As detailed in relation to television receiver 200 of FIG. 2, a television receiver may have multiple tuners. While a first tuner may be assigned to tuning to the transponder stream containing a first television channel, other tuners of the television receiver may be idle. For example, if the television receiver has five tuners, the four tuners not being used to tune to the first television channel may be idle. An idle tuner may be defined as a tuner that is not being used to receive a transponder stream for presentation of a television channel via a presentation device or for recording of a television channel. For the remainder of the described embodiment of method 600, it is assumed that a total of four tuners are present and that three tuners are idle (with the remaining tuner being used to tune to the first television channel). Other numbers of tuners and numbers of available tuners may be present in other embodiments of method 600.

In method 600, determination of the availability of audio/video decoding resources may not be necessary. Since only television channels actually selected by the user are decoded, availability of audio/video decoder submodules may not be important for determining how many television channels can be at least partially prepared for presentation. Rather, the availability of pre-decode space may serve as a limiting factor. For instance, based on the amount of buffer space available, a certain number of television channels may be buffered using a pre-decode buffer. As such, the availability of buffer space may serve as a limiting factor.

At step 630, one or more television channels (other than the first channel, which is already being output for presentation) may be selected based on prediction criteria. These prediction criteria may specify television channels that are considered likely for a user to select for presentation. Various forms of prediction criteria are detailed in reference to FIG. 4. At step 630, the number of television channels selected based on the prediction criteria may be based on the number of tuners that were identified as idle at step 620. For example, if three tuners were identified as idle, then three television channels may be selected at step 630; if one television tuner was identified as idle at step 620, then a single television channel may be selected at step 630. If no idle television tuners are available, method 600 may end at step 630. In some embodiments, the availability of pre-decode buffer space (e.g., in pre-decode buffer 246 of television receiver 200 of FIG. 2) may also be used to determine the number of television channels that can be selected based on the prediction criteria.

At step 640, each of the idle tuners identified at step 620 may tune to a television channel of the one or more television channels selected at step 630. Accordingly, each tuner previously identified as idle tunes to a different television channel of the one or more television channels. If only a single idle television tuner was identified, then only a single television channel (which is different than the first television channel) may be tuned to. For this exemplary embodiment, since three idle tuners were identified at step 620, three television channels were identified at step 630 based on the prediction criteria. Therefore, at step 640, the three tuners identified as idle are each tuned to a different transponder stream having the three television channels selected at step 630.

At step 650, for each of the one or more television channels that have not yet been selected by the user, at least the compressed video frames, which may be in an MPEG format may be buffered in a pre-decode buffer, such as pre-decode buffer 246 of television receiver 200. The first frame buffered for a television channel may be an I-frame. Other frames received prior to the first I-frame for the television channel may be discarded. Once the first I-frame is received and buffered, other frames (e.g., P- and B-frames) may also be buffered at step 660. This may continue for each of the one or more television channels. Once a new I-frame is received for a particular television channel of the one or more television channels, the other buffered frames for the television channel, including P-frames, B-frames, and the previous I-frame are purged from the buffer (or otherwise discarded) at step 670. The new I-frame may be buffered along with subsequent P- and B-frames. Method 600 may repeat by buffering and discarding compressed video data, without decoding the video or audio data until a channel change command is received that results in the selection of one of the one or more television channels. Following selection of the television channel of the one or more television channels, the buffered video frames for the television channel may be decoded and used for output of the television channel by the television receiver for presentation. As such, an I-frame may not need to be waited for to commence video decoding following a command selecting the television channel of the one or more television channels because the previous I-frame as already been received and buffered.

Figure 7:
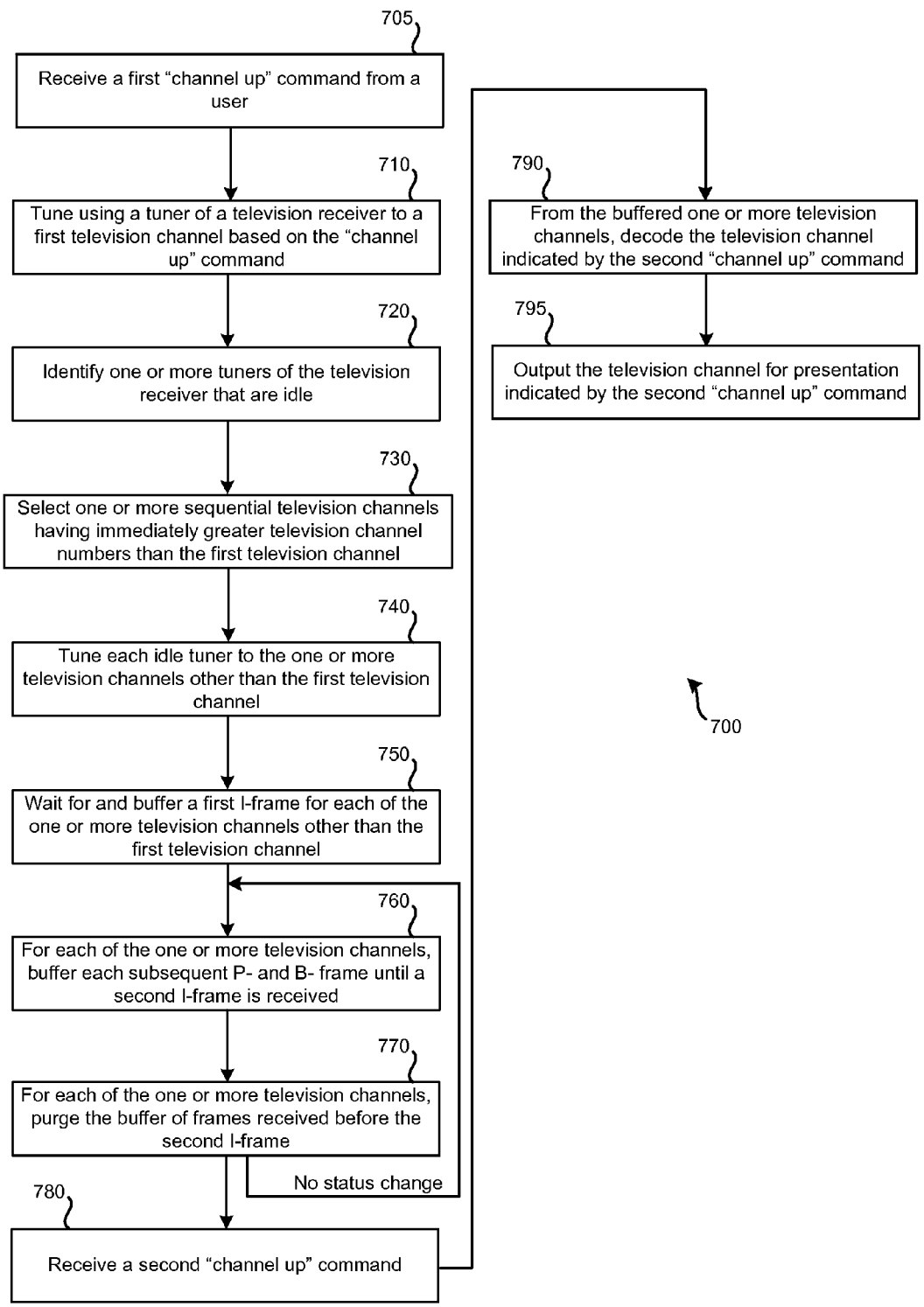
FIG. 7 illustrates an embodiment of a method for preparing one or more television channels for presentation during channel surfing without anticipatory decoding.

FIG. 7 illustrates an embodiment of method for preparing one or more television channels for presentation during channel surfing without preemptory decoding (that is, without decoding before the user has selected the television channel for output for presentation). Satellite television distribution system 100 of FIG. 1 may be used to perform method 700. Television receiver 200 of FIG. 2 may be used to perform method 700. Further, other embodiments of television distribution systems (e.g., a cable television distribution system) and television receivers may be configured to perform method 700. Some or all steps of method 700 may be performed using one or more computer systems. Means for performing the steps of method 700 include: one or more components of system 100, one or more components of television receiver 200, and/or one or more computer systems.

Method 700 is generally directed to a situation where a user provides a "channel up" command. It should be understood that method 700 may be modified to perform similar steps in response to a "channel down" command. Further, while method 700 is directed to a user "channel surfing" by using "channel up" and "channel down" commands, it should be understood that the prediction criteria of method 400 of FIG. 4 and the associated description may additionally or alternatively be used to select the one or more television channels for preparation. Method 700 may represent a more detailed embodiment of method 600 of FIG. 6. Method 700 represents a situation where a finite number of tuners and a finite amount of decoding resources are available. Of course, a finite amount of decryption (CA) resources and buffering resources are also available, however, the limiting factor may tend to be tuning resources and decoding resources. The CA resources may be able to decrypt control words (or other encryption data) for a large number of television channels, for example, based on the same encryption data being used across multiple television channels. To buffer a television channel, a relatively small amount of buffer space may be necessary, such as 80 megabytes in order to buffer television channels for two seconds on 40 Mbps transponder streams. As such, tuners and decoding resources may be most likely to the limiting factor in preparing additional channels for presentation.

In possible embodiments of a television receiver, eight tuners may be present. If the most popular television channels are transmitted using eight transponder streams (each of which includes ten television channels), the television receiver may be able to simultaneously tune to and receive the eighty most popular television channels. If sufficient decoding resources are available, each of these eighty television channels may be decoded for output. If not, all or some of these eighty television channels may be buffered such that decoding can occur if the television channel is selected. If the CA has enough processing capabilities, it may be possible to decrypt encryption data (e.g., control words) needed to decode each of these television channels and the eighty television channels could be buffered after being descrambled using the encryption data. If the CA does not have enough processing capabilities, it may be possible to store the still encrypted encryption data needed to decode each of these television channels and the eighty television channels could be buffered while still scrambled. If a television channel is selected that was buffered while scrambled, the CA could then be used to decode the encrypted encryption data needed to descramble the buffered data for the television channel.

At step 705, a first "channel up" command may be received by the television receiver. This command may be received based on a user pressing a "channel up" button on a remote control in communication with the television receiver. At step 710, in response to the "channel up" command, a tuner of a television receiver may be tuned to a transponder stream that contains a first television channel. This first television channel may have a channel number that is the next greater available television channel from the previously tuned to television channel. The television receiver may assign a tuner of the television receiver to tune to a transponder stream that contains the first television channel. As previously detailed in relation to FIG. 2, using a network information table and/or one or more other related stored tables, the television receiver may be able to determine a proper transponder stream to which tuning is required and the data packets within the transponder stream corresponding to the television channel based on PIDs. Because two television channels have consecutive television channel numbers, in a satellite television distribution network, these television channels may not be part of the same transponder stream and may be transmitted using different transponders and/or satellites. In the instance of a satellite-based television system, the television receiver may use a network information table (NIT) to determine a proper satellite and/or transponder to which tuning is required to receive the transponder stream that contains the first television channel. Tuning to a particular transponder stream may involve the use of a single tuner. As such, if multiple television channels are desired to be presented and/or recorded from a single transponder stream, only a single tuner may be necessary to receive the transponder stream. If the first television channel is being output to a presentation device, such as a television, an audio/video decoding module (such as one of the audio/video decoding submodules of FIG. 2) may receive (descrambled) video/audio data packets that were received by the tuner and may convert the descrambled video/audio data packets to a format appropriate to be output to a presentation device. For instance, this may involve conversion from an MPEG format (or some other compressed video/audio format) to a format appropriate for output to a presentation device.

At step 720, one or more tuners of the television receiver may be identified that are idle. While a tuner may be assigned to tuning to the transponder stream containing a first television channel, other tuners of the television receiver may be idle. At step 730, one or more television channels (other than the first channel already being output for presentation) may be selected. Since a "channel up" command was received at step 705, the television channels selected at step 730 may be sequential television channels having immediately greater television channel numbers than the first television channel, such as presented in FIG. 5B. As an example, if a channel up command is received that results in the first channel being television channel number 27, idle tuners may be assigned to transponder streams containing television channel numbers 28, 29, and 30. In some embodiments, television channels unavailable to the television receiver are skipped. (In embodiments involving a "channel down" command being received, the television channels selected at step 730 may be sequential television channels having immediately lower television channel numbers than the channel number of the first television channel.)

At step 730, the number of television channels selected may be based on the number of tuners that were identified as idle at step 720. For example, if three tuners were identified as idle, then three television channels may be selected at step 730; if one television tuner was identified as idle at step 720, then a single television channel may be selected at step 730. If no idle television tuners are available, method 700 may end at step 530. Since multiple television channels may be received as part of the same transponder stream, a tuner may be assigned to transponder streams of each of the sequential television channels and may also receive the other channels contained on the same transponder stream. As such, sequential television channels immediately greater than the first television channel may be tuned to which may also allow a plurality of other television channels that happen to be transmitted as part of the same transponder streams to be received.

In method 700, the number of audio/video decoder submodules available for use in decoding may not be used to determine the number of television channels that are prepared for viewing. Rather than decoding the one or more television channels, before any of the one or more television channels are selected by a user for viewing, the compressed video (and, possibly, audio) data may be buffered (instead of being decoded). As such, the amount of available audio/video decoding resources may not serve as a limiting factor on preparing television channels for viewing. However, the amount of buffer space may serve as an alternating factor.

At step 740, each of the idle tuners identified at step 720 may tune to a television channel of the one or more sequential television channels selected at step 730. Accordingly, each tuner previously identified as idle may tune to a transponder stream having a different television channel of the one or more television channels. If more than one of the television channels are transmitted to the television receiver as part of the same transponder stream, only a single tuner may be needed to tune to the transponder stream. Further, other television channels that happen to be transmitted as part of the same transponder stream may be received.

At step 750, for each of the one or more television channels (which have not yet been selected by the user), at least the compressed video frames, which may be in an MPEG format) may be buffered in a pre-decode buffer, such as pre-decode buffer 246 of television receiver 200. The first frame buffered for a television channel may be an I-frame. Other frames received prior to the first I-frame may be discarded. Once the first I-frame is received and buffered for a television channel, other frames (e.g., P- and B-frames) may also be buffered at step 760. If a frame is received out-of-order, such as a frame that is for presentation after an I-frame yet to be received, the out-of-order frame may not be deleted when the I-frame is received.

Once a new I-frame is received for a particular television channel of the one or more television channels, the other buffered frames for the television channel, including P-frames, B-frames, and the previous I-frame may be purged from the buffer (or otherwise discarded) at step 770. The new I-frame may be buffered along with subsequent P- and B-frames. Method 700 may (partially) repeat by buffering and discarding compressed video data, without decoding the video or audio data until a channel change command is received that results in the selection of one of the one or more television channels.

At step 780, a second channel up command is received. This command results in one of the one or more television channels being selected. In response to receiving the selection of the television channel of the one or more television channels, the buffered video frames (which were buffered before the second command was received at step 780) for the television channel may be decoded at step 790 and used for output of the television channel by the television receiver for presentation at step 795. As such, a previously stored I-frame for the television channel may be may not need to be waited for to be received before commencing video decoding following a command selecting the television channel of the one or more television channels because the previous I-frame for the television channel has already been buffered (before the command selecting the television channel was selected).

Figure 8:
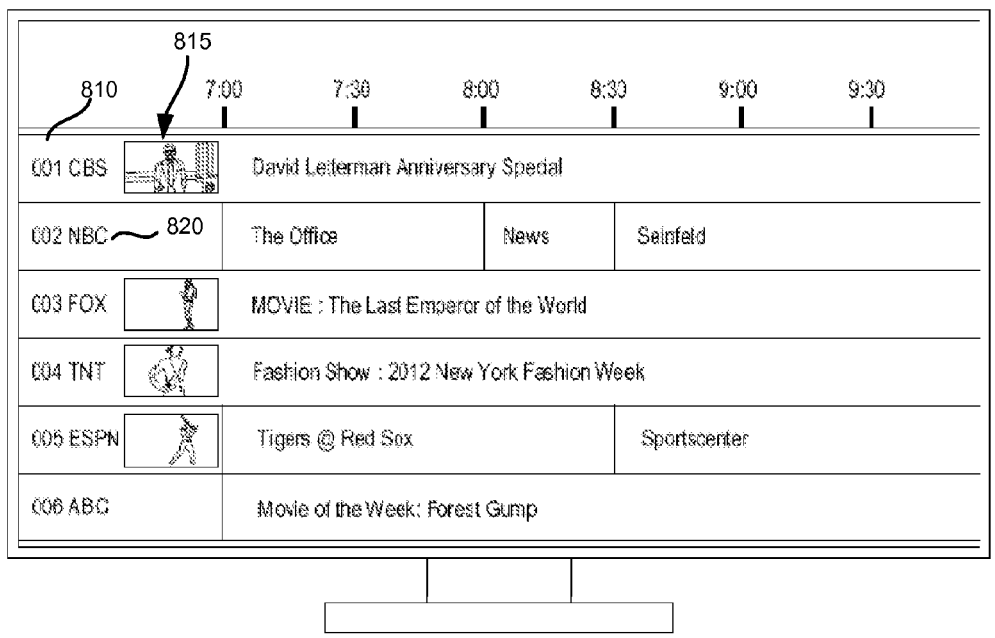
FIG. 8 illustrates an embodiment of an EPG previewing television channels that have been prepared for presentation.

FIG. 8 illustrates an embodiment of a television 800 displaying an EPG previewing television channels that have been prepared for presentation. Television channel entries in the EPG, such as channel 810, that have an image 815 displayed may be television channels that have been prepared for presentation. As such, the corresponding transponder stream may be tuned to and the television channel 810 may be decoded. An image 815, such as the most recent I-frame for the television channel may be displayed when the EPG is displayed. Otherwise, the decoded output of television channel 810 may be discarded. Television channel 820, which does not have an associated image, may not be prepared for presentation. It should be understood that FIG. 8 illustrates one embodiment, various other embodiments may be visually different from FIG. 8.

In some embodiments, each image 815 is a video feed of the corresponding television channel. In some embodiments, the video feeds 815 may correspond to channels selected for tuning and decoding (i.e., channels that have been prepared for presentation) based at least in part on EPG operations. Thus, in certain embodiments, as a user is using an EPG to view channel/program options, video for one or more of those channels corresponding to the channel/program options displayed with the EPG in a given EPG window may be decoded and displayed along with the EPG. For example, a user is scrolling through the guide, somewhere for each channel line on the guide, video 815 for each channel 810 may be displayed. Channels may be tuned to and decoded based at least in part on EPG operations in various embodiments according to the following discussion in reference to FIGS. 9-12. In any one or more of those embodiments, one or more of the tuned and decoded channel(s) may provide the decoded output for the video feeds shown in the EPG.

Additionally, with regard to various embodiments according to the following discussion in reference to FIGS. 9-12, various principles discussed previously with respect to direct channel selection (i.e., channel selection without using an EPG) may be applicable to embodiments where an EPG is used; instead of the direct channel selections (such as channel up/down commands), certain embodiments may be based at least in part on EPG operations.

Figure 9:
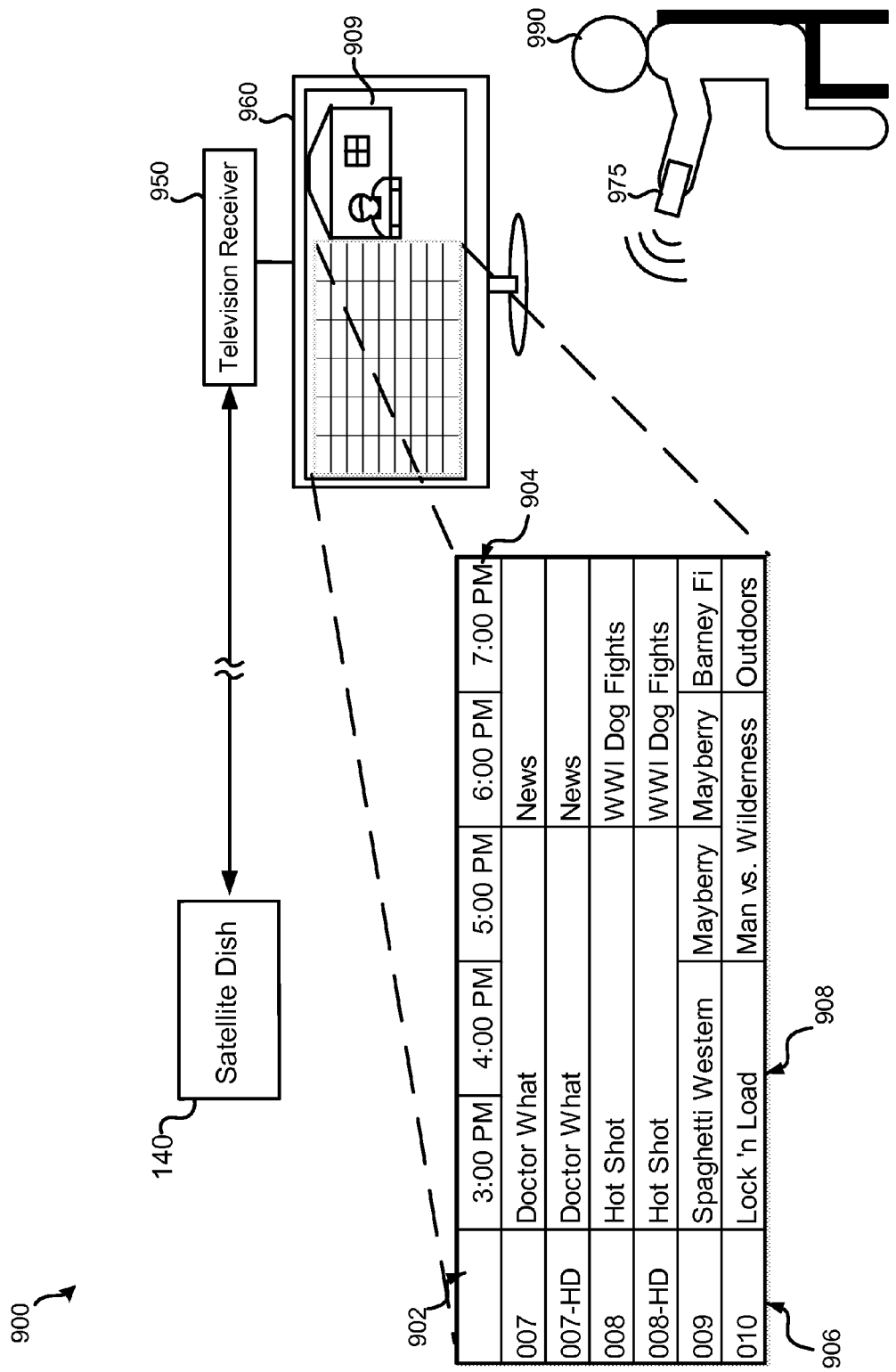
FIG. 9 illustrates a system with a non-limiting example display of an EPG.

FIG. 9 depicts a system 900 with a non-limiting example display 902 of an EPG, which may correspond data from EPG database 230. Certain embodiments may provide for using multiple tuners and decoders in a television tuning system to reduce channel change time based at least in part on an EPG. Certain embodiments may use one or more tuners and decoders to anticipate a user's next channel request based at least in part on an EPG. One or more predictions can be made as to which channel(s) a user is likely to select with the EPG. Based at least in part on the prediction(s), one or more tuners and decoders may be used to tune to and start decoding the one or more predicted channels, prior to user selection of the one or more predicted channels. When a user selects one of the predicted channels, the user may not have to wait for the tune and decode times to progress before programming for the selected channel could be presented; the programming could be presented instantly in response to the user selection.

In some embodiments, as depicted, the display 902 of the EPG may be executed by the television receiver 950, which may correspond to other television receivers disclosed herein, and may be displayed on the display device 960, which may correspond to the display device 160. As depicted, the example display 902 shows an EPG view that takes up a portion of the screen of the display device 960. In various embodiments, the EPG view may take up the entire screen or only a portion, such as a lower portion, a side portion, a combination of lower and side portions, etc. In some embodiments, a viewing window 909 that may display a program may be displayed in addition to the EPG view 902. The EPG view 902 shows a certain view of the overall EPG information with certain times 904, certain channels options 906, and certain corresponding program options 908. The EPG display 902 may exemplify available programming that a user 990 may see and be able to select for display via a remote control device 975.

In certain embodiments, a set of anticipated channels may be based at least in part on one or more of those channels options 906 currently being displayed to a user with the EPG view 902. For example, as the user 990 is using an EPG to view channel/program options, only a select number of channel options 906 may be displayed with the EPG view 902 to the user 990 at one time. In some embodiments, one or more of the channels corresponding to such a display of channels options 906 in the EPG view 902 may be automatically selected by the television receiver 950 for preemptive tuning and decoding. In certain embodiments, all of the channels corresponding to the channel options 906 displayed in the viewing window 903 may be automatically tuned into and decoded. In certain embodiments, the number of channels automatically tuned into and decoded may be dependent on the number of idle tuners available.

Figure 10:
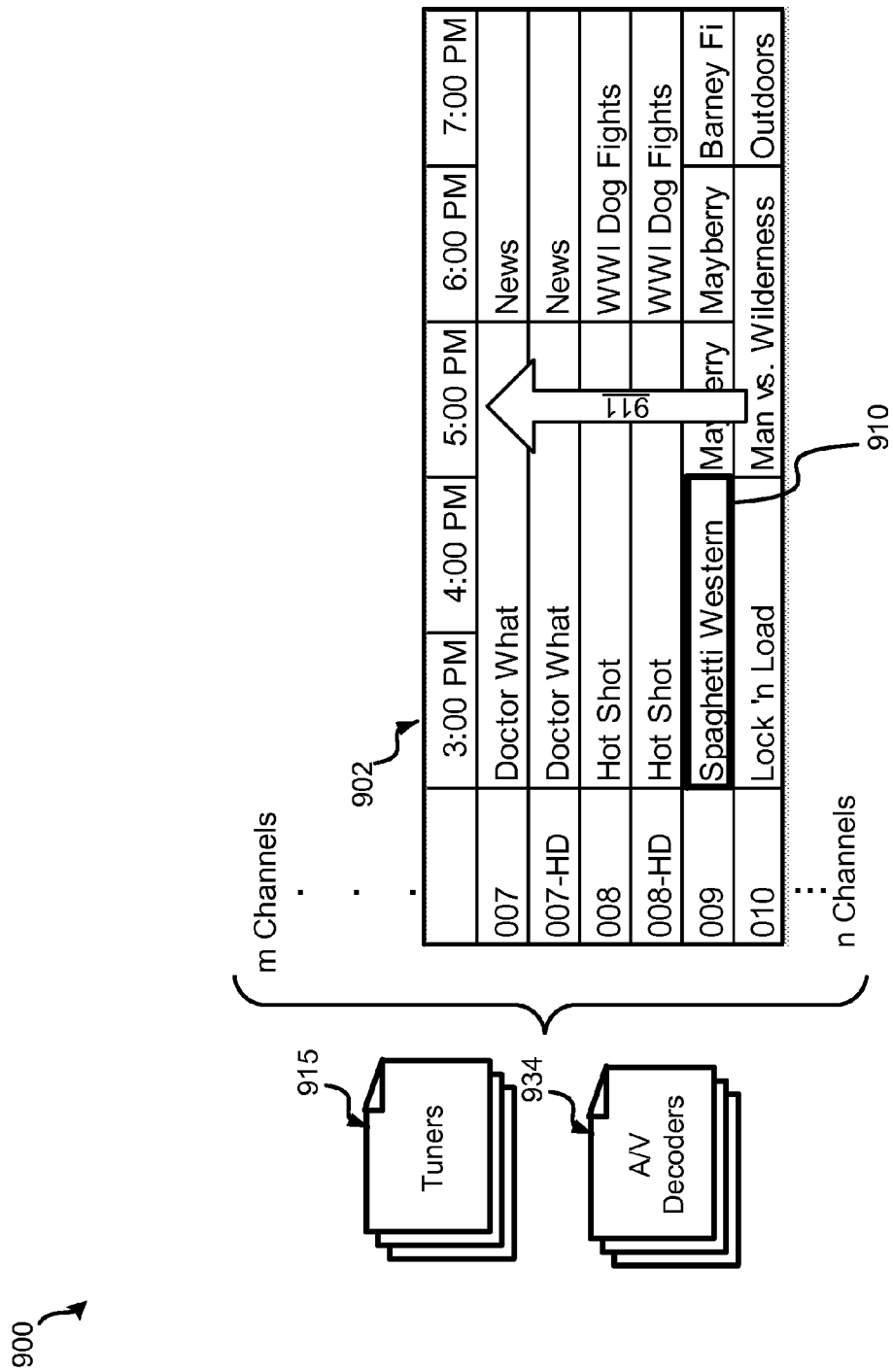
FIG. 10 illustrates a functional diagram of system with a non-limiting example display of an EPG.

FIG. 10 depicts a functional diagram of system 900 with the non-limiting example display 902 of an EPG, in accordance with certain embodiments of the present disclosure. As depicted, the user 990 has highlighted 910 a particular program corresponding to a particular channel. In certain embodiments, before a user selects a "channel up" or "channel down" option in the EPG to navigate and highlight another program corresponding to another channel, one or more tuners 915 and/or audio/video decoders 934 could have the corresponding audiovisual content ready for immediate display if the user selects the "channel up" or "channel down" option.

In some embodiments, a single spare tuner could be used to decode the next channel, either up or down, depending on the previous direction 911 the user had taken. Depicted is an example indication 911 that the user 990 is scrolling in an upward direction 911 through the EPG view 902.

In certain embodiments, one or more of a set of channel options about to be displayed to the user 990 (i.e., a next set of one or more channel options displayable with a scrolling operation, page-up operation, or a page-down operation with the EPG) may correspond to a set of anticipated channels for preemptive tuning and decoding. As depicted, one or more of a set of m channel options may be displayed if the user 990 navigates upward through the EPG in the direction 911. As depicted, one or more of a set of n channel options may be displayed if the user 990 navigates downward through the EPG, opposite to the direction 911.

As one example, a next set of m channel options corresponding to the next displayable viewing window 902 in the direction 911 that the user 990 is traversing the EPG may be preemptively tuned to and decoded. The one or more m channels may be preemptively tuned to and decoded even though the user 990 has not specifically selected one of the channels to tune to.

For example, in certain embodiments, before a user selects a "channel up" or "channel down" option in the EPG, one or more tuners 915 could have the corresponding audiovisual content ready for immediate display if the user selects the "channel up" or "channel down" option and selects a channel/program to tune to. In some embodiments, a single spare tuner 915 could be used to decode the next channel, either up or down, depending on the previous direction the user had taken in navigating the EPG. This could be extended to (n) spare tuners 915 in various embodiments, when additional tuners 915 may be dedicated to one or more channels in the direction that the navigation is trending. For example, one or more additional tuners 915 may be dedicated to one or more of the second, third, fourth, etc. channels up, if the navigation is trending upward 911. In addition, one or more additional tuners 915 may be dedicated to one or more channels in the opposite direction of the navigation trend, in case the user reverses operation during surfing. For example, one or more additional tuners 915 may be dedicated to one or more of the next, second, third, fourth, etc. channels down.

A tuner of the television receiver 950 may be tuned to a first television channel not represented by the EPG view 902. That first television channel may have been selected by the user 990 via the remote control device 975. One or more tuners 915 of the television receiver 950 may be identified that are idle. Additionally or alternatively, the availability of audio/video decoding resources may be determined. Such idle resources may be assigned to the preemptive tuning and/or decoding.

In various embodiments, any suitable number of spare tuners 915 may be employed and may be dedicated to one or more channels in the direction the channel change is trending. For example, any suitable number of tuners 915 may be to any suitable number of channel extending in the direction 911 to m Channels, as depicted. In addition, any suitable number of tuners 915 may be dedicated to any suitable number of extending oppositely to the direction 911 of the channel change trend to n Channels, as depicted, in case the user 990 reverses operational direction during surfing.

In some embodiments, one tuner 915 of the set of one or more tuners 915 may be dedicated to one channel. In some embodiments, each tuner 915 may each be dedicated to only one channel, in a 1:1 tuner-to-channel relationship. In some embodiments, one tuner 915 of the set of one or more tuners 915 may be dedicated to multiple channels.

In certain embodiments, after the user stops using the EPG, one or more tuners 915 used for fast channel change could be released for other uses. In some embodiments, the release could be immediately upon exiting the EPG view 902. For example, the one or more tuners 915 used for fast channel change could be released when a user selects a channel for full-screen viewing and exits an EPG display mode. In some embodiments, the release could be after any suitable time period. For example, the one or more tuners 915 used for fast channel change could be released after any suitable time period has elapsed since a user 990 selected a channel/program option to tune to for full-screen viewing. This may accommodate the case where the user 990 switches back to the EPG view 902 after viewing a selected channel/program for a time period. In some embodiments, the release could be performed in a serial fashion such that not all tuners 915 used for fast channel change are released at the same time. For example, one or more tuners 915 dedicated to the furthest channel(s) from the current channel (e.g., the fifth channel away from the current channel) could be released before others. As another example, if one or more tuners are dedicated to multiple lists (e.g., to two more of a favorites list, a history-based list, an EPG-based list, etc.), one or more tuners 915 dedicated to the least recently used list could be released before others.

Figure 11:
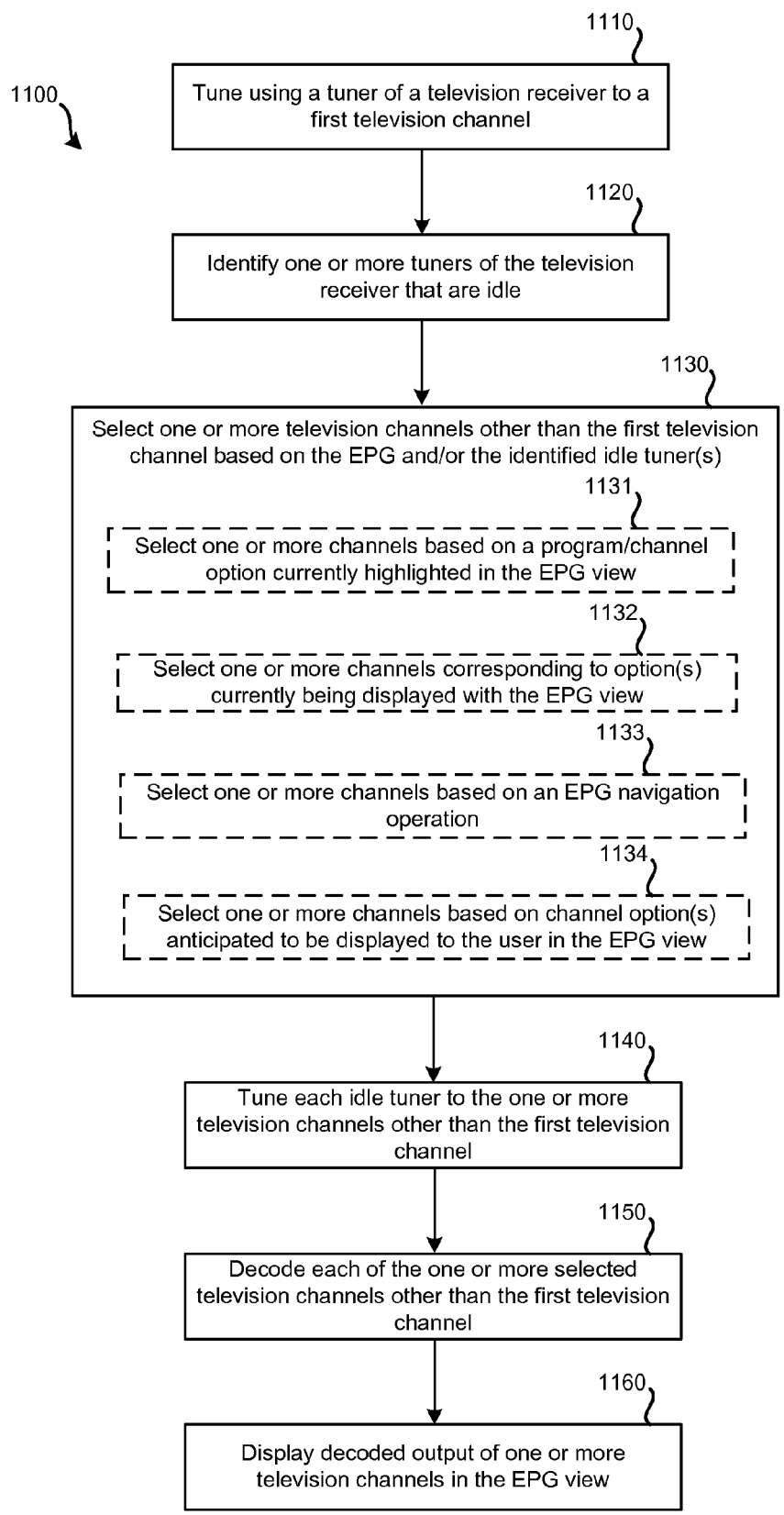
FIG. 11 illustrates an embodiment of a method for preparing one or more television channels for presentation based at least in part on an EPG.

FIG. 11 illustrates an embodiment of a method 1100 for preparing one or more television channels for presentation based at least in part on an EPG, in accordance with certain embodiments of the present disclosure. The principles discussed previously with respect to channel selection (for example without limitation, the method 500) are applicable to the embodiments of system 900 and method 1100; instead of the direct channel selections (such as channel up/down commands) of method 500, certain embodiments may be based at least in part on EPG navigation. One or more of the systems, television receivers, and/or other components disclosed herein may be used to perform method 1100. Further, other embodiments in accordance with the present disclosure may be configured to perform method 1100. Some or all steps of method 1100 may be performed using one or more computer systems. Means for performing the steps of method 1100 include: one or more components of systems disclosed herein, one or more components of television receivers disclosed herein, and/or one or more computer systems.

At step 1110, a tuner of a television receiver may be tuned to a first television channel. This first television channel may have been selected by a user, as discussed previously. At step 1120, one or more tuners of the television receiver may be identified that are idle. In accordance with certain embodiments disclosed herein, a television receiver may have multiple tuners. While a tuner may be assigned to tune to the transponder stream containing a first television channel, other tuners of the television receiver may be idle. For example, if the television receiver has eight tuners, the seven tuners not being used to tune to the first television channel may be idle. That is, the idle tuners are not being used to receive a transponder stream for presentation of a television channel via a presentation device or for recording of a television channel. Additionally or alternatively, at step 1120, the availability of audio/video decoding resources may be determined. For example, referring to television receiver 200 of FIG. 2, the number of audio/video decoder submodules 234 that are idle may be determined. That is, one or more audio/video decoder submodules are not being used to decode video and/or audio received from a DVR or descrambling engine.

As indicated by step 1130, one or more television channels (other than the first channel already being output for presentation) may be selected based at least in part on the EPG and the identified idle tuners. In various embodiments, the step 1130 may include any or combination of the following. As indicated by step 1131, one or more of those channels options may be selected based at least in part on a program/channel option currently highlighted in the EPG view. In some cases, a program/channel option may be automatically highlighted at the initial display of the EPG view. For example, the program/channel option corresponding to the first television channel may be highlighted. In some cases, a program/channel option may be highlighted responsive to an EPG navigation command by the user.

As indicated by step 1130, the number of television channels selected may be based at least in part on the number of tuners that were identified as idle at step 1120. For example, if seven tuners were identified as idle, then seven television channels may be selected at step 1130; if one television tuner was identified as idle at step 1120, then a single television channel may be selected at step 1130. If no idle television tuners are available, method 1100 may end at step 1130. In some embodiments, the number of audio/video decoder submodules available for use for decoding may also be used to determine the number of television channels selected. In some embodiments, whichever module (tuners or decoders) has less idle time will serve as the limiting factor for the number of television channels selected at step 1130. For example, if three tuners are idle but only two audio/video decoder submodules are idle, then only two television channels may be selected at step 1130 for preparation.

As indicated by step 1132, in some embodiments, one or more channels corresponding to channel option(s) currently being displayed to a user with the EPG view may be selected for preparation. As indicated by step 1133, in some embodiments, one or more channels corresponding to those channel option(s) currently being displayed to a user with the EPG view may be selected based at least in part on an EPG navigation operation. An EPG navigation operation may include one or more of an EPG view upon initial display of the EPG, an EPG scrolling operation up/down the EPG listing (where the EPG view shifts up/down the EPG lists such that one or more different channel/program options are displayed), an EPG page-up operation, an EPG page-down operation, changing a highlighted selection of a channel and/or program option to a different channel and/or program option up/down the EPG listing, and/or a selection of a program option to tune to from an EPG view. An EPG navigation command may correspond to any of the foregoing EPG navigation operation possibilities. As indicated by step 1134, in some embodiments, one or more channels may be selected based at least in part on channel option(s) anticipated to be displayed to the user (i.e., a next set of one or more channel options displayable with a scrolling operation, a page-up operation, and/or a page-down operation with the EPG).

Various embodiments may employ any one or combination of the foregoing bases. The number of channel options currently displayed in the EPG view may be compared to the number of idle tuners available. If only one idle tuner is available, the channel corresponding to the currently highlighted channel/program option in the EPG view may be selected for tuning, decoding, and/or displaying in some embodiments, in the case that the currently highlighted channel/program option does not correspond to the first television channel that has already been tuned to per step 1110. For example, the user may have highlighted a channel/program option corresponding to a second television channel different from the first television channel. In the case that the currently highlighted channel/program option does correspond to the first television channel that has already been tuned to per step 1110, a channel corresponding to a channel option nearby the currently highlighted channel/program option in the EPG view may be selected in some embodiments. For example, in some embodiments, the next channel up or down may be selected.

If the number of idle tuners available is greater than one, a set of channels corresponding to channel options including and/or nearby the currently highlighted channel/program option in the EPG view may be selected in various embodiments. For example, in some embodiments, a set of the channels may be selected such that the channel corresponding to the currently highlighted channel/program option is the middle member of the set or otherwise near the middle of the set (in the case of an even number of members in the set). If the number of idle tuners available equals or exceeds the number of channel options displayed in the EPG view, all of the channels corresponding to the EPG view may be selected in some embodiments. In the case of the number of idle tuners exceeding the number of the number of channel options displayed in the EPG view, additional channels corresponding to the channel options displayable in a next or adjusted EPG view (either up or down the EPG listing) may be selected in some embodiments. In some embodiments, television channels unavailable to the television receiver are skipped.

As indicated by step 1140, each of the idle tuners identified at step 1120 may tune to a television channel of the one or more television channels selected at step 1130. Accordingly, each tuner previously identified as idle may tune to a different television channel of the one or more television channels. If only a single idle television tuner was identified, then only a single television channel (which is different than the first television channel) may be tuned to.

As indicated by step 1150, each of the one or more television channels tuned to at step 1140 may be decoded, as previously discussed herein. While the one or more television channels are tuned to and decoded, at this point, a user may not have selected any of the one or more television channels for presentation, but may still be viewing the EPG. As such, the tuning at step 1140 and the decoding at step 1150 may be invisible to the user. In other words, the video/audio decoded at step 1150 may not be output to a presentation device or stored using a DVR, in some embodiments. Rather, received audio/video data may be temporarily buffered, decoded for output, then discarded, in some embodiments. As such, rather than outputting to a presentation device, the output may be discarded without output for presentation or recording.

As indicated by step 1160, in some embodiments, the output from the audio/video decoder submodule performing such decoding functions may be displayed in the EPG view. The decoded output may be provided for those channels shown in the EPG, as discussed with respect to FIG. 8, where each image 815 is a video feed of the corresponding television channel. In some embodiments, as further discussed herein, all of the channels corresponding to the EPG view may be display in the EPG view. That display mode may be a default in some embodiments, when a sufficient number of idle resources is available. Accordingly, as a user is using an EPG to view channel/program options, video for all or a subset of those channels corresponding to the channel/program options displayed with the EPG in a given EPG window may be decoded and displayed along with the EPG.

Figure 12:
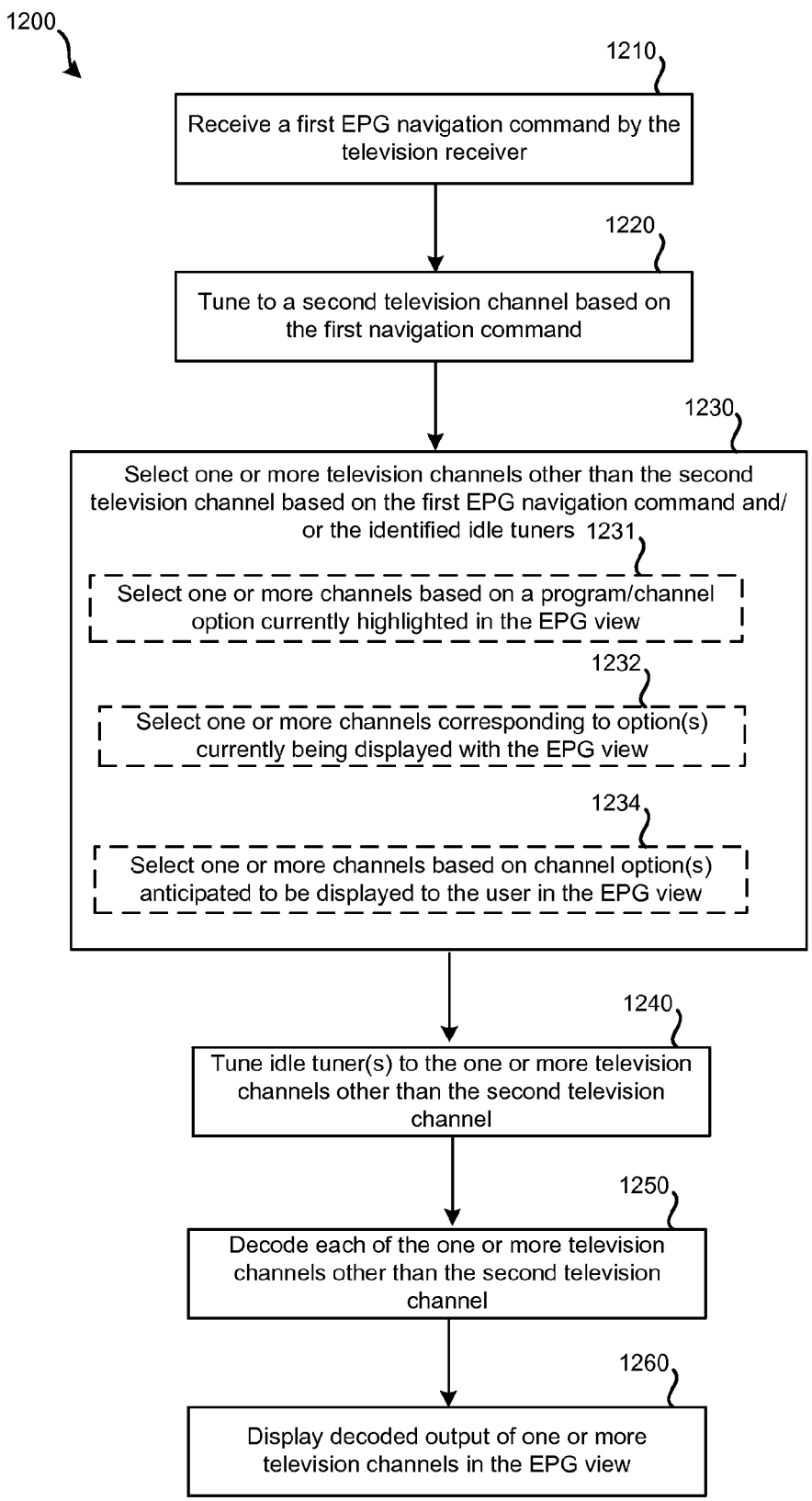
FIG. 12 illustrates an embodiment of a method for preparing one or more television channels for presentation based at least in part on an EPG.

FIG. 12 illustrates an embodiment of a method 1200 for preparing one or more television channels for presentation based at least in part on an EPG, in accordance with certain embodiments of the present disclosure. The method 1200 may include an implementation of a subprocess based at least in part on step 1133, among other steps of method 1100. The principles discussed previously with respect to channel selection (for example without limitation, the method 500) are applicable to the embodiments of the method 1200; instead of the direct channel selections (such as channel up/down commands) of method 500, certain embodiments may be based at least in part on EPG navigation.

As indicated by step 1210, a first EPG navigation command may be received by the television receiver. This command may be received responsive to a user pressing an "up" button, a "down" button, a "page-up" button, or a "page-down" button on a remote control in communication with the television receiver. As indicated by step 1220, in response to the first EPG navigation command, a tuner of the television receiver may be tuned to at least a second television channel. This second television channel may correspond to the television channel/program highlighted as a result of the navigation command. For example, in the example of FIG. 10, if the highlighted section 910 was previously highlighting a program corresponding to channel 009, as depicted, the resulting selection may correspond to channel 008-HD being highlighted if the navigation command was a single selection of the "up" button. As another example, the resulting selection may correspond to channel 010 being highlighted if the navigation command was a single selection of the "down" button. As yet another example, the resulting selection may correspond to channel 006 (not shown) being highlighted if the navigation command was a single selection of the "page-up" button. As still another example, the resulting selection may correspond to channel 013 (not shown) being highlighted if the navigation command was a single selection of the "page-down" button.

The television receiver may assign a tuner of the television receiver to tune to a transponder stream that contains the first television channel, as previously detailed. In some embodiments, the tuner may be selected from the idle tuners identified with step 1120. Thus, for example, method 1200 may be an extension of method 1100 in some embodiments. However, in other embodiments, a set of idle tuners may again or initially be identified prior to step 1220.

As indicated by step 1230, one or more television channels (other than the second channel already being output for presentation) may be selected based at least in part on the first EPG navigation command and/or the number of the identified idle tuners. For example, the first EPG navigation command may indicate a navigation trend (i.e. the direction of the navigation, either up or down the EPG listing). As indicated by step 1231, one or more channels may be selected based at least in part on a program/channel option currently highlighted in the EPG view. As indicated by step 1232, one or more channels corresponding to option(s) currently being displayed with the EPG view may be selected. As indicated by step 1234, one or more channels may be selected based at least in part on channel option(s) anticipated to be displayed to the user in the EPG view. Steps 1231, 1232, and 1234 may respectively correspond to steps 1131, 1132, and 1134, with steps 1231, 1232, and 1234 corresponding to embodiments based at least in part on the direction of the navigation.

If the number of idle tuners available is greater than one, a set of channels corresponding to channel options including and/or nearby the channel option corresponding to the second channel in the EPG view in the direction of the navigation may be selected. In the case of an upward direction, the television channels selected may be sequential television channels having immediately lesser television channel numbers than the second television channel (assuming the channels in the EPG listing are ordered as depicted in the example of channel options 906). As an example, if a single "up" command is received that results in the second channel being television channel number 008-HD, idle tuners may be assigned to television channel numbers 008-HD, 008, and 007-HD, or more depending on the number of available tuners. In some embodiments, television channels unavailable to the television receiver are skipped. In the case of an upward direction of the navigation command being received, the television channels selected may be sequential television channels having immediately greater television channel numbers than the channel number of the second television channel (again, assuming the channels in the EPG listing are ordered as depicted in the example of channel options 906). As indicated by step 1234, in the case of a sufficient number of idle tuners being available, additional channels corresponding to the channel options displayable in a next EPG view (either up or down the EPG listing, depending on the navigation direction) may be tuned to and/or decoded in some embodiments.

As indicated by step 1240, idle tuner(s) may be tuned to the one or more television channels other than the second television channel. As indicated by step 1250, the one or more television channels other than the second television channel may be decoded. As indicated by step 1260, the decoded output of the one or more television channels may be displayed in the EPG view, similar to the display with respect to step 1160 of FIG. 11.

Figure 13:
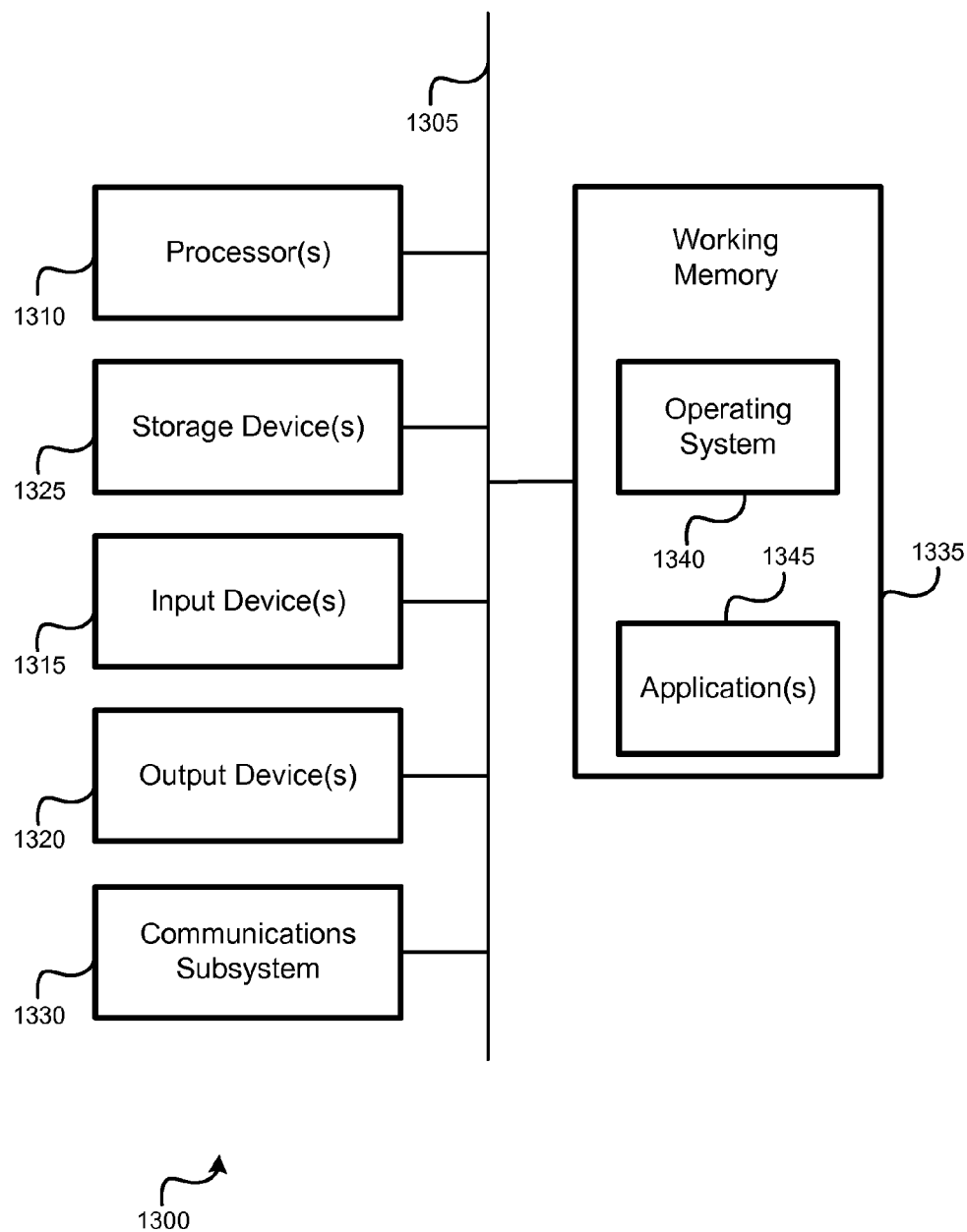
FIG. 13 illustrates an embodiment of a computer system.

A computer system as illustrated in FIG. 13 may be incorporated as part of the previously described computerized devices. For example, computer system 1300 can represent some of the components of the television receivers and/or the television service provider systems discussed in this application. FIG. 13 provides a schematic illustration of one embodiment of a computer system 1300 that can perform the methods provided by various other embodiments, as described herein. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including, without limitation, one or more general-purpose processors and/or one or more special-purpose processors (such as digital signal processing chips, graphics acceleration processors, and/or the like); one or more input devices 1315, which can include, without limitation, a mouse, a keyboard, and/or the like; and one or more output devices 1320, which can include, without limitation, a display device, a printer, and/or the like.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 1300 might also include a communications subsystem 1330, which can include, without limitation, a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1330 may permit data to be exchanged with a network (such as the network described below, to name one example), other computer systems, and/or any other devices described herein. In many embodiments, the computer system 1300 will further comprise a working memory 1335, which can include a RAM or ROM device, as described above.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1325 described above. In some cases, the storage medium might be incorporated within a computer system, such as computer system 1300. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1300) to perform methods in accordance with various embodiments of the invention. According to a set of embodiments, some or all of the procedures of such methods are performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the non-transitory storage device(s) 1325. Merely by way of example, execution of the sequences of instructions contained in the working memory 1335 might cause the processor(s) 1310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300.

The communications subsystem 1330 (and/or components thereof) generally will receive signals, and the bus 1305 then might carry the signals (and/or the data, instructions, etc., carried by the signals) to the working memory 1335, from which the processor(s) 1310 retrieves and executes the instructions. The instructions received by the working memory 1335 may optionally be stored on a non-transitory storage device 1325 either before or after execution by the processor(s) 1310.

It should further be understood that the components of computer system 1300 can be distributed across a network. For example, some processing may be performed in one location using a first processor while other processing may be performed by another processor remote from the first processor. Other components of computer system 1300 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A television receiver, comprising:
a plurality of tuners;
one or more processors; and
a memory communicatively coupled with and readable by the one or more processors and having stored therein processor-readable instructions which, when executed by the one or more processors, cause the one or more processors to perform a method, the method comprising:
identifying one of the plurality of tuners as being idle, wherein being idle corresponds to not being used to receive any television channel data for presentation or recording;
outputting for presentation an electronic programming guide that indicates programming;
selecting a plurality of television channels for preparation, wherein the plurality of television channels are selected:
based at least in part on one or more electronic programming guide operations; and
prior to receiving user input selecting a television channel of the plurality of television channels for presentation;
preparing the television channel for presentation by tuning to and buffering without decoding the television channel prior to receiving the user input selecting the television channel for presentation; and
releasing the one of the plurality of tuners for tuning to another television channel following passage of a particular time period after user-selection of the television channel within the electronic programming guide for access thereby.

2. The television receiver of claim 1, wherein: the one or more electronic programming guide operations comprise outputting for presentation, by the television receiver, an electronic programming guide view, the electronic programming guide view comprising indications of channel options; and the selecting of the plurality of television channels for preparation is based at least in part on the indications of channel options.

3. The television receiver of claim 2, wherein: the electronic programming guide view further comprises a highlighted selection that corresponds to one or more of the indications of channel options; and the selecting of the plurality of television channels for preparation is based at least in part on the highlighted selection.

4. The television receiver of claim 1, wherein: the one or more electronic programming guide operations comprise a navigation operation; and the selecting of the plurality of television channels for preparation is based at least in part on the navigation operation.

5. The television receiver of claim 4, wherein: the navigation operation comprises a scrolling operation; and the selecting of the plurality of television channels for preparation is based at least in part on a direction of the scrolling operation.

6. A method for preparing a television channel for presentation, comprising:
   identifying, by a set top box, a tuner of the set top box as being idle, wherein being idle corresponds to not being used to receive any television channel data for presentation or recording;
   outputting for presentation, by the set top box, an electronic programming guide that indicates programming;
   selecting, by the set top box, the television channel for preparation, wherein the television channel is selected:
      based at least in part on one or more electronic programming guide operations; and
      prior to receiving user input selecting the television channel for presentation;
   preparing the television channel for presentation by tuning to, by the tuner, and buffering without decoding the television channel prior to receiving the user input selecting the television channel for presentation;
   outputting for display within the electronic programming guide a graphical indicator that is associated with the television channel as an indication that the television channel is prepared for presentation by being buffered but not decoded; and
   releasing the tuner for tuning to another television channel following passage of a particular time period after user-selection of the television channel within the electronic programming guide for access thereby.

7. The method for preparing the television channel for presentation of claim 6, wherein:
   the one or more electronic programming guide operations comprise outputting for presentation, by the set top box, an electronic programming guide view, the electronic programming guide view comprising indications of channel options; and
   the selecting of the television channel is based at least in part on the indications of channel options.

8. The method for preparing the television channel for presentation of claim 7, wherein:
   the electronic programming guide view further comprises a highlighted selection that corresponds to one or more of the indications of channel options; and
   the selecting of the television channel is based at least in part on the highlighted selection.

9. The method for preparing the television channel for presentation of claim 6, wherein:
   the one or more electronic programming guide operations comprise a navigation operation; and
   the selecting of the television channel is based at least in part on the navigation operation.

10. The method for preparing the television channel for presentation of claim 9, wherein: the navigation operation comprises a scrolling operation; and the selecting of the television channel is based at least in part on a direction of the scrolling operation.

11. A non-transitory processor-readable medium for preparing a television channel for presentation, comprising processor-readable instructions configured to cause one or more processors to:
   identify one or more tuners that are idle, wherein being idle corresponds to not being used to receive any television channel data for presentation or recording;
   output for presentation an electronic programming guide that indicates programming;
   select one or more television channels for preparation, wherein the one or more television channels are selected:
      based at least in part on one or more electronic programming guide operations; and
      prior to receiving user input selecting a television channel of the one or more television channels for presentation; and
   prepare the television channel for presentation by tuning, by a tuner of the one or more tuners, to the television channel prior to receiving the user input selecting the television channel of the one or more television channels for presentation and by buffering the television channel without decoding the television channel;
   outputting for display within the electronic programming guide at least one graphical indicator that is associated with the television channel as an indication that the television channel is prepared for presentation as being buffered and undecoded; and
   releasing the tuner for tuning to another television channel in response to a detected command to exit or close the electronic programming guide.

12. The non-transitory processor-readable medium for preparing a television channel for presentation of claim 11, wherein:
   the one or more electronic programming guide operations comprise outputting for presentation, by the set top box, an electronic programming guide view, the electronic programming guide view comprising indications of channel options; and
   the selecting of the one or more television channels is based at least in part on the indications of channel options.

13. The non-transitory processor-readable medium for preparing a television channel for presentation of claim 12, wherein:
   the electronic programming guide view further comprises a highlighted selection that corresponds to one or more of the indications of channel options; and
   the selecting of the one or more television channels is based at least in part on the highlighted selection.

14. The non-transitory processor-readable medium for preparing a television channel for presentation of claim 11, wherein:
   the one or more electronic programming guide operations comprise a navigation operation; and
   the selecting of the one or more television channels is based at least in part on the navigation operation.

* * * * *